US 8,750,876 B2

(12) United States Patent
Dimou et al.

(10) Patent No.: US 8,750,876 B2
(45) Date of Patent: Jun. 10, 2014

(54) METHODS AND DEVICES FOR ADJUSTING RESOURCE MANAGEMENT PROCEDURES IN HETEROGENEOUS COMMUNICATION NETWORKS BASED ON CELL INFORMATION

(75) Inventors: Konstantinos Dimou, San Francisco, CA (US); Jan-Erik Berg, Sollentuna (SE); Yu Yang, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 51 days.

(21) Appl. No.: 13/454,857

(22) Filed: Apr. 24, 2012

(65) Prior Publication Data
US 2013/0210435 A1   Aug. 15, 2013

Related U.S. Application Data

(60) Provisional application No. 61/599,041, filed on Feb. 15, 2012.

(51) Int. Cl.
*H04W 72/04* (2009.01)

(52) U.S. Cl.
USPC .................. 455/436; 455/452.1; 370/331

(58) Field of Classification Search
USPC ........... 455/456.1–456.6, 436, 552, 423, 424, 455/452.1, 441, 444, 67.16, 69, 556; 370/331
See application file for complete search history.

(56) References Cited

U.S. PATENT DOCUMENTS 8,401,556 B2 * 3/2013 Uehara et al. ................. 455/436
8,442,513 B2 * 5/2013 Krishnamurthy et al. .... 455/423
2009/0286485 A1 * 11/2009 Tomokiyo et al. .......... 455/67.16
2010/0255834 A1 * 10/2010 Ishii .............................. 455/424
2010/0298001 A1 * 11/2010 Dimou et al. ................. 455/441
2011/0021201 A1 * 1/2011 Lee et al. ...................... 455/444
2011/0263257 A1   10/2011 Kago et al.
2012/0270536 A1 * 10/2012 Ratasuk et al. ............... 455/423
2012/0275391 A1 * 11/2012 Cui et al. ...................... 370/329
2013/0001354 A1 * 1/2013 Meyer et al. ................. 244/3.19
2013/0005381 A1 * 1/2013 Turkka et al. ................ 455/517

FOREIGN PATENT DOCUMENTS

WO   2011123006 A1   10/2011

* cited by examiner

*Primary Examiner* — Kashif Siddiqui
*Assistant Examiner* — Khawar Iqbal
(74) *Attorney, Agent, or Firm* — Rothwell, Figg, Ernst & Manbeck, P.C.

(57) ABSTRACT

Devices and methods for adjusting resource management procedures in a mobile device communicating with a node operating in a cell in a heterogeneous communication network are disclosed. In one aspect, a method includes receiving a signal, including a reference signal, transmitted from the node during a predetermined time period, measuring signal reception information, including reference signal power values, at predetermined time intervals during the predetermined time period, measuring speeds of movement of the mobile device at the predetermined time intervals, determining a reference signal power variation value based on the variability of the measured reference signal power values, comparing the determined reference signal power variation value with a predetermined power threshold value for a given measured speed, determining cell information based on the comparison, determining an adjustment to a resource management procedure based on the determined cell information, and adjusting the resource management procedure based on the determined adjustment.

50 Claims, 24 Drawing Sheets

2100

| INFORMATION ELEMENTS | |
|---|---|
| Message Type | Cell Information Request |
| UE Identity | CHOICE |
| | S-TMSI |
| | Random Value |
| Establishment Cause | CHOICE |
| | Emergency |
| | High Priority Access |
| | Mobile Terminating Access |
| | Mobile Originating Signaling |
| | Mobile Originating Data |
| Cell Characteristics Info | CHOICE |
| | Cell Size |
| | Cell Type |
| | System Load |
| | Node Information |

2200

| INFORMATION ELEMENTS | |
|---|---|
| Message Type | Cell Information Request |
| RRC Transaction Identifier | CHOICE |
| | |
| | |
| Cell Characteristics Info | CHOICE |
| | Cell Size |
| | Cell Type |
| | System Load |
| | Node Information |

FIG. 22

METHODS AND DEVICES FOR ADJUSTING RESOURCE MANAGEMENT PROCEDURES IN HETEROGENEOUS COMMUNICATION NETWORKS BASED ON CELL INFORMATION

CROSS-REFERENCE TO RELATED APPLICATIONS

The present application claims priority benefit under 35 U.S.C. §119(e) of U.S. Provisional Patent Application No. 61/599,041, entitled "Cell Size Detection Methods in Heterogeneous Networks," filed Feb. 15, 2012, the contents of which are incorporated herein by reference in their entirety.

TECHNICAL FIELD

The present invention relates generally to heterogeneous communication networks, and more particularly, to methods and devices for adjusting resource management procedures in heterogeneous communication networks based on cell information.

BACKGROUND

Currently, the deployment of heterogeneous networks (HetNets) is viewed as one of the most cost efficient deployment strategies for wireless communication systems in addressing the growing traffic demands and the expectation for higher data rates. Typical cellular networks today are characterized by non-uniform user and traffic distributions. HetNets complement the macro networks with low power nodes (LPN), such as micro, pico, and femto base stations or relay nodes, which can achieve significantly improved capacity and high data rates.

In heterogeneous networks, there are various types of base stations, each of which can be associated with differing cell sizes. For instance, large base stations, such as macrocell base stations, are typically installed on masts, rooftops and other existing structures. Macrocell base stations normally have power outputs on the order of tens of watts and, thus, provide large cell coverage. Small base stations, such as micro, pico and femto cell base stations are Low Power Nodes (LPNs) which are commonly designed for residential or small business environments. The power outputs for these small base stations are normally less than a watt to a few watts, which results in a small cell coverage range.

In wireless communication systems with a heterogeneous network deployment, mobility management is a challenging task. Investigations have been undertaken to evaluate performance of hard handover in orthogonal frequency-division multiplexing (OFDM) based cellular systems, such as 3GPP Long-Term Evolution (LTE) or IEEE 802. System level simulation results have been extensively discussed within standardization, such as 3GPP. Simulation results from these studies show that the careful choice of handover triggers (i.e., Time-to-Trigger and signal hysteresis) for cells of different sizes can lead to substantial reduction in handover failure rate, as well as system and service performance improvements.

In wireless communication systems with a heterogeneous network deployment, it is important to choose the optimal mobility trigger to use when a mobile device, such as user equipment (UE), is operating in different types of cells, e.g. different mobility triggers should be used when the UE is operating in large cells, such as a macro cell, as compared with when the UE is operating in small cells, such as a micro, pico or femto cell. Failure to use the optimal mobility trigger in such systems can be more severe than in normal networks featuring uniform deployment of cells. For example, with a large Time-to-Trigger in a macro cell, the handover might be delayed, which means that the communication with the serving base station is very likely experiencing higher loss rate and, thus, a higher probability of radio link failure. In addition, this communication interferes with the micro, pico or femto base station eNodeB (eNB) or low power node (LPN) in uplink, and in downlink, UEs served by LPNs and located close to small cell's borders are heavily interfered with by the transmissions to the UE still connected to the macro base station (eNB). These interference effects are more pronounced and more troublesome for an operator in a wireless communication system with a heterogeneous network deployment, than in a homogeneous network.

Currently, the cell selection and handover functionality in LTE is controlled by the network. While the UE provides measurements to the network (i.e., eNB), the UE is unable to influence or respond dynamically to perform optimized handover decisions. The handover triggers, as well as additional mobility related parameters, such as Layer 3 filtering coefficients and measurement bandwidth, are configured by the eNB and transmitted to the UE via measurement control messages. The UE uses the configured parameters to evaluate the configured events, e.g., the cell reselection is implicitly controlled by the network.

One drawback for this conventional method is that the measurement report from the UE is a L3 filtered value of reference signal received power (RSRP)/reference signal received quality (RSRQ), which does not represent the current real-time link quality as a result of filtering and because there is a time delay between when the UE measures RSRP/RSRQ and when the measurements are available at the serving eNB. This time delay can range from few msecs up to hundreds of msecs. Moreover, the UE, once it has reported RSRP/RSRQ to the network, has to wait during a given time period before the UE can report updated RSRP/RSRQ values to the network. This time period is on the order of a few hundreds of msecs.

Considering cell size as part of adapting mobility related parameters leads to mobility performance improvements. More specifically, it has been discussed within 3GPP that different mobility triggers should be used when the UE is located in a large cell, as compared with when the UE is located in a small cell. The UE, however, even with these different mobility triggers, is unable to determine which sets of triggers to use since the UE is not aware of the cell size within its current cell, unless instructed by the network. It is noted that, in 3GPP TS 36.423, the Cell Type IE, which contains the information of cell size (very small, small, medium, large), is included in the Last Visited Cell IE in the UE History Information IE, and is included in the Source eNB to Target eNB Transparent Container IE in the Handover Request message over 51. However, this information (i.e., cell type/cell size) is only exchanged among the networks, and the UE does not have any information on cell type and cell size.

Accordingly, there is a need for a method and device for adjusting resource management procedures in a mobile device communicating with a node operating in a cell in a heterogeneous communication network that can improve system and service performance by optimizing handover procedures, decreasing the handover failure rate, and by improving radio resource management such as uplink power control, radio link failure recovery and link adaptation.

SUMMARY

Particular embodiments of the present invention are directed to devices and methods for adjusting resource management procedures in heterogeneous communication networks.

In one particular aspect, a method for adjusting resource management procedures in a mobile device communicating with a node operating in a cell in a heterogeneous communication network includes receiving a signal, including a reference signal, transmitted from the node during a predetermined time period. The method further includes measuring signal reception information at predetermined time intervals during the predetermined time period. The signal reception information includes reference signal power values. The method further includes measuring speeds of movement of the mobile device at the predetermined time intervals, determining a reference signal power variation value based on the variability of the measured reference signal power values, comparing the determined reference signal power variation value with a predetermined power threshold value for a given measured speed, determining cell information based on the comparison, determining an adjustment to a resource management procedure based on the determined cell information, and adjusting the resource management procedure based on the determined adjustment.

In some embodiments, the cell information includes information relating to one or more of cell size and cell type. In some embodiments, the resource management procedure is a radio resource management procedure and adjusting the radio resource management procedure includes adjusting one or more of handover, uplink (UL) power control, radio link failure (RLF) recovery and link adaptation.

In some embodiments, adjusting handover includes one or more of setting the size of a measurement report, setting a value of a measurement gap, determining a Time-to-Trigger value, and determining a signal hysteresis value.

According to particular embodiments of the present invention, the signal reception information includes one or more of reference signal quality values and signal to interference plus noise ratio values, and the method further includes determining one or more of a reference signal quality variation value based on the variability of the measured reference signal quality values and a signal to interference plus noise ratio variation value based on the variability of the measured signal to interference plus noise ratio values, and comparing one or more of the determined reference signal quality variation value with a predetermined quality threshold value for a given speed and the determined signal to interference plus noise ratio variation value with a predetermined signal to interference plus noise ratio threshold value for a given speed. In such embodiments, determining the cell information is based on the comparisons for reference signal power and one or more of reference signal quality and signal to interference plus noise ratio variations.

In some embodiments, the reference signal power values are reference signal received power (RSRP) values and the reference signal quality values are reference signal received quality (RSRQ) values.

According to particular embodiments of the present invention, the signal reception information includes Doppler frequency shift values, and the method includes comparing the received Doppler frequency shift values with a predetermined Doppler signature. In such embodiments, determining the cell information is based on the comparisons for reference signal power variation and Doppler frequency shift.

According to particular embodiments of the present invention, the signal reception information includes information relating to the vertical angle of arrival of the received signal, and the method includes determining an estimated location of an antenna located at the node based on the vertical angle of arrival of the received signal and comparing the determined estimated location with a predetermined elevation value. In such embodiments, determining the cell information is based on the comparisons for antenna location and for reference signal power variation.

Particular embodiments provide a mobile device operable in a heterogeneous communication network to transmit messages to and receive messages from a node operating in a cell. According to certain embodiments of the present invention, the mobile device includes a processor, a memory coupled to the processor, a transceiver coupled to the processor, and an antenna coupled to the transceiver configured to transmit and receive messages. In some embodiments, the processor is configured to receive a signal, including a reference signal, transmitted from the node during a predetermined time period. The processor may be configured to measure signal reception information, including reference signal power values, at predetermined time intervals during the predetermined time period, measure speeds of movement of the mobile device at the predetermined time intervals, determine a reference signal power variation value based on the variability of the measured reference signal power values, compare the determined reference signal power variation value with a predetermined power threshold value for a given measured speed, determine cell information based on the comparison, determine an adjustment to a resource management procedure based on the determined cell information, and adjust the resource management procedure based on the determined adjustment.

According to particular embodiments of the present invention, the signal reception information includes one or more of reference signal quality values and signal to interference plus noise ratio values, and the processor is further configured to determine one or more of a reference signal quality variation value based on the variability of the measured reference signal quality values and a signal to interference plus noise ratio variation value based on the variability of the measured signal to interference plus noise ratio values, and compare one or more of the determined reference signal quality variation value with a predetermined quality threshold value for a given speed and the determined signal to interference plus noise ratio variation value with a predetermined signal to interference plus noise ratio threshold value for a given speed. In such embodiments, determining the cell information is based on the comparisons for reference signal power and one or more of reference signal quality and signal to interference plus noise ratio variations.

According to particular embodiments of the present invention, the signal reception information includes Doppler frequency shift values, and the processor is further configured to compare the received Doppler frequency shift values with a predetermined Doppler signature. In such embodiments, determining the cell information is based on the comparisons for reference signal power variation and Doppler frequency shift.

According to particular embodiments of the present invention, the signal reception information includes information relating to the vertical angle of arrival of the received signal, and the processor is further configured to determine an estimated location of an antenna located at the node based on the vertical angle of arrival of the received signal, and compare the determined estimated location with a predetermined elevation value. In such embodiments, the determination of the cell information is based on the comparisons for antenna location and for reference signal power variation.

In another particular aspect, a method for adjusting resource management procedures in a mobile device communicating with a node operating in a cell in a heterogeneous communication network includes receiving messages transmitted from the node during a predetermined time period. The messages are radio resource control (RRC) measurement configuration messages including information relating to handover triggers. The method further includes comparing the received handover trigger information with predetermined handover trigger values, determining cell information based on the comparison, determining an adjustment to a resource management procedure based on the determined cell information, and adjusting the resource management procedure based on the determined adjustment.

In some embodiments, the handover trigger information and predetermined handover trigger values include information relating to one or more of handover margin and time to trigger values.

According to particular embodiments of the present invention, the method further includes receiving a signal, including a reference signal, transmitted from the node during the predetermined time period, measuring signal reception information, including one or more of reference signal power values, reference signal quality values and signal to interference plus noise ratio values, at predetermined time intervals during the predetermined time period, measuring speeds of movement of the mobile device at said predetermined time intervals, determining one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values, and comparing one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed. In such embodiments, determining cell information is based on the comparisons for handover triggers and one or more of reference signal power, reference signal quality, and signal to interference plus noise ratio variations.

Particular embodiments provide a mobile device operable in a heterogeneous communication network to transmit messages to and receive messages from a node operating in a cell. According to certain embodiments of the present invention, the mobile device includes a processor, a memory coupled to the processor, a transceiver coupled to the processor, and an antenna coupled to the transceiver configured to transmit and receive messages. The processor may be configured to receive messages transmitted from the node during a predetermined time period. The messages are radio resource control (RRC) measurement configuration messages including information relating to handover triggers. The processor may be configured to compare the received handover trigger information with predetermined handover trigger values, determine cell information based on the comparison, determine an adjustment to a resource management procedure based on the determined cell information, and adjust the resource management procedure based on the determined adjustment.

According to particular embodiments of the present invention, the processor is further configured to receive a signal, including a reference signal, transmitted from the node during the predetermined time period, measure signal reception information, including one or more of reference signal power values, reference signal quality values and signal to interference plus noise ratio values, at predetermined time intervals during the predetermined time period, wherein said signal reception information, measure speeds of movement of the mobile device at said predetermined time intervals, determine one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values, and compare one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed. In such embodiments, determining cell information is based on the comparisons for handover triggers and one or more of reference signal power, reference signal quality, and signal to interference plus noise ratio variations.

In another particular aspect, a method for adjusting resource management procedures in a mobile device communicating with a node operating in a cell in a heterogeneous communication network includes receiving system information transmitted from the node during a predetermined time period. The system information includes information relating to cell signal power values. The method further includes comparing the received cell signal power information with predetermined cell signal power values, determining cell information based on the comparison, determining an adjustment to a resource management procedure based on the determined cell information, and adjusting the resource management procedure based on the determined adjustment.

In some embodiments, the system information includes system information blocks (SIBS) and the cell signal power is a cell reference signal (CRS) power.

According to particular embodiments of the present invention, the method further includes receiving a signal, including a reference signal, transmitted from the node during the predetermined time period, measuring signal reception information, including one or more of reference signal power values, reference signal quality values and signal to interference plus noise ratio values, at predetermined time intervals during the predetermined time period, measuring speeds of movement of the mobile device at said predetermined time intervals, determining one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values, and comparing one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed. In such embodiments, determining cell information is based on the comparisons for cell signal power information and one or more of reference signal power, reference signal quality, and signal to interference plus noise ratio variations.

Particular embodiments provide a mobile device operable in a heterogeneous communication network to transmit messages to and receive messages from a node operating in a cell. According to certain embodiments of the present invention, the mobile device includes a processor, a memory coupled to the processor, a transceiver coupled to the processor, and an antenna coupled to the transceiver configured to transmit and receive messages. In some embodiments, the processor is configured to receive system information transmitted from the node during a predetermined time period. The system information includes information relating to cell signal power values. The processor may be further configured to compare the received cell signal power information with predetermined cell signal power values, determine cell information based on the comparison, determine an adjustment to a resource management procedure based on the determined cell information, and adjust the resource management procedure based on the determined adjustment.

According to particular embodiments of the present invention, the processor is further configured to receive a signal, including a reference signal, transmitted from the node during the predetermined time period, measure signal reception information, including one or more of reference signal power values, reference signal quality values and signal to interference plus noise ratio values, at predetermined time intervals during the predetermined time period, measure speeds of movement of the mobile device at said predetermined time intervals, determine one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values, and compare one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed. In such embodiments, determining cell information is based on the comparisons for cell signal power information and one or more of reference signal power, reference signal quality, and signal to interference plus noise ratio variations.

The above and other aspects and embodiments are described below with reference to the accompanying drawings.

BRIEF DESCRIPTION OF THE DRAWINGS

The accompanying drawings, which are incorporated herein and form part of the specification, illustrate various embodiments of the present disclosure and, together with the description, further serve to explain the principles of the disclosure and to enable a person skilled in the pertinent art to make and use the embodiments disclosed herein. In the drawings, like reference numbers indicate identical or functionally similar elements.

FIG. 22 is a diagram of information elements of a radio resource control (RRC) cell information response message for use in a method for adjusting resource management procedures in a mobile device communicating with a node operating in a cell in a heterogeneous communication network, in accordance with exemplary embodiments of the present invention.

DETAILED DESCRIPTION

In exemplary embodiments of the disclosed methods and devices, a method for adjusting resource management procedures in a mobile device communicating with a node operating in a cell in a heterogeneous communication network is described. In the methods and devices described herein, radio resource management procedures in a mobile device are adjusted to, for example, optimize handover and improve uplink power control, radio link failure recovery and link adaptation, based on cell information determined using one or more of reference signal power variation, reference signal quality variation, signal to interference plus noise ratio variation, Doppler frequency shift, antenna location, handover triggers and cell signal power information. The determined cell information may provide, for example, information on cell size and cell type, enabling the mobile device to adjust one or more aspects of the radio resource management procedures utilized by the mobile device. For example, the mobile device may set the size of a measurement report, set the value of measurement gap, determine a Time-to-Trigger value and determine a signal hysteresis value, to optimize handover or adjust aspects of its uplink power control, radio link failure recovery and link adaptation, as described in further detail below.

Figure 1:
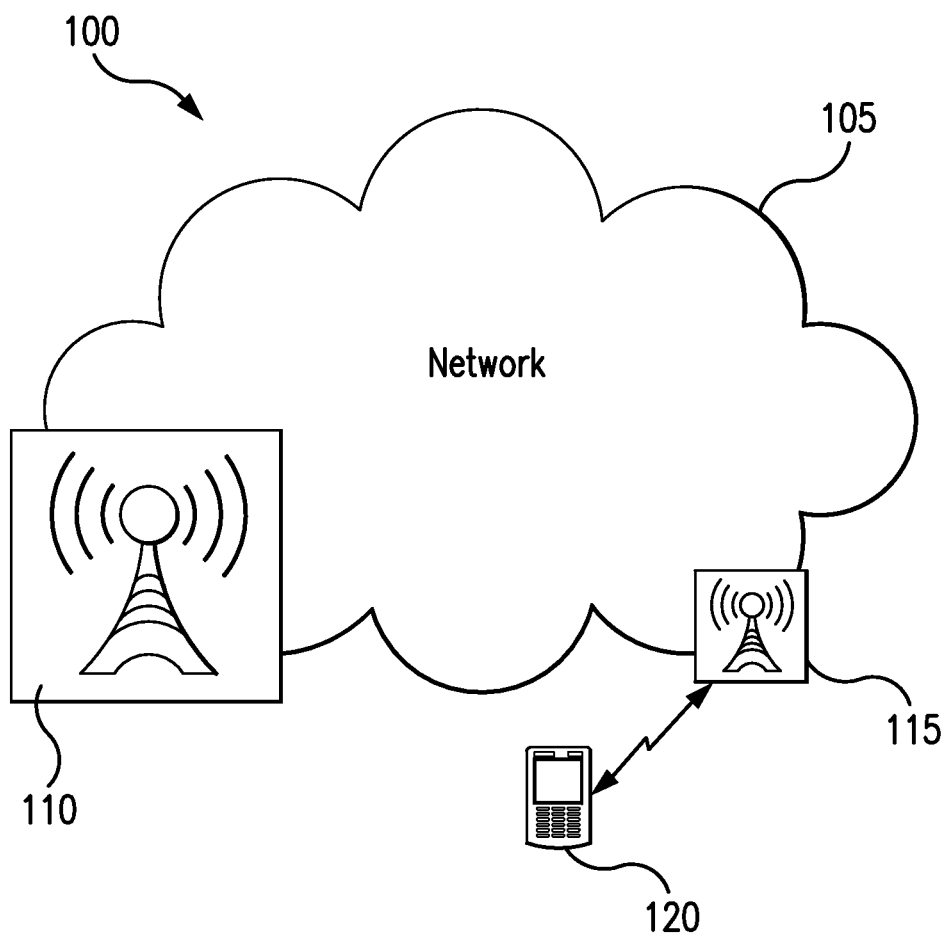
FIG. 1 illustrates an architecture of a wireless communication system with a heterogeneous network deployment, in accordance with exemplary embodiments of the present invention.

Referring now to FIG. 1, an architecture of a wireless communication system 100 with a heterogeneous network deployment, in accordance with exemplary embodiments of the present invention, is illustrated. As shown, wireless communication system 100 includes a wireless network 105, nodes 110 and 115, and mobile devices 120. Examples of node 110 include base stations and relay nodes, such as, for example, high power, and macrocell base stations and relay nodes. Examples of node 115 include base stations and relay nodes, such as, for example, low power, micro, pico, and femto base stations and relay nodes. Examples of mobile devices 120 include wireless User Equipment (UE) and communication devices, such as, for example, mobile telephones, personal digital assistants, electronic readers, portable electronic tablets, personal computers, and laptop computers.

Figure 2:
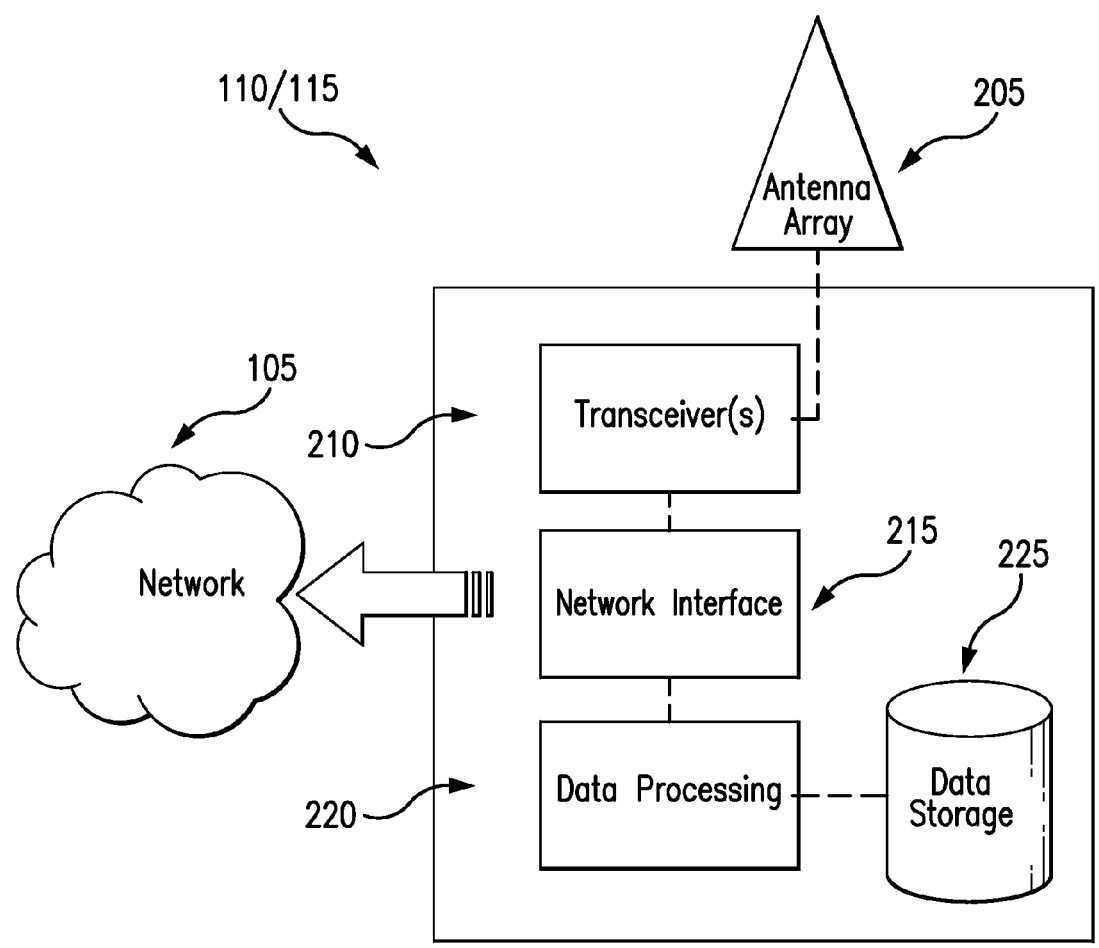
FIG. 2 is a block diagram of a node, as used in the system of FIG. 1 in accordance with exemplary embodiments of the present invention.

Referring now to FIG. 2, a block diagram of nodes 110 and 115, as used in the system of FIG. 1 in accordance with exemplary embodiments of the present invention, is illustrated. As shown in FIG. 2, node 110 and 115 may include: a data processing system 220, which may include one or more microprocessors and/or one or more circuits, such as an application specific integrated circuit (ASIC), Field-programmable gate arrays (FPGAs), and the like; network interface 215; and a data storage system 225, which may include one or more non-volatile storage devices and/or one or more volatile storage devices (e.g., random access memory (RAM)). The network interface 215 is connected to transceiver 210, which is configured to transmit and receive signals via an antenna array 205. In embodiments where data processing system 220 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that, when executed by a processor, the code causes the data processing system 220 to perform steps described below (e.g., steps described below with reference to the flow chart shown in FIG. 24). In other embodiments, the nodes 110 and 115 are configured to perform steps described above without the need for code. That is, for example, data processing system 220 may consist merely of one or more ASICs. Hence, the features of the present invention described above may be implemented in hardware and/or software. For example, in particular embodiments, the functional components of the nodes 110 and 115 described above may be implemented by data processing system 220 executing computer instructions, by data processing system 220 operating independent of any computer instructions, or by any suitable combination of hardware and/or software.

Figure 3:
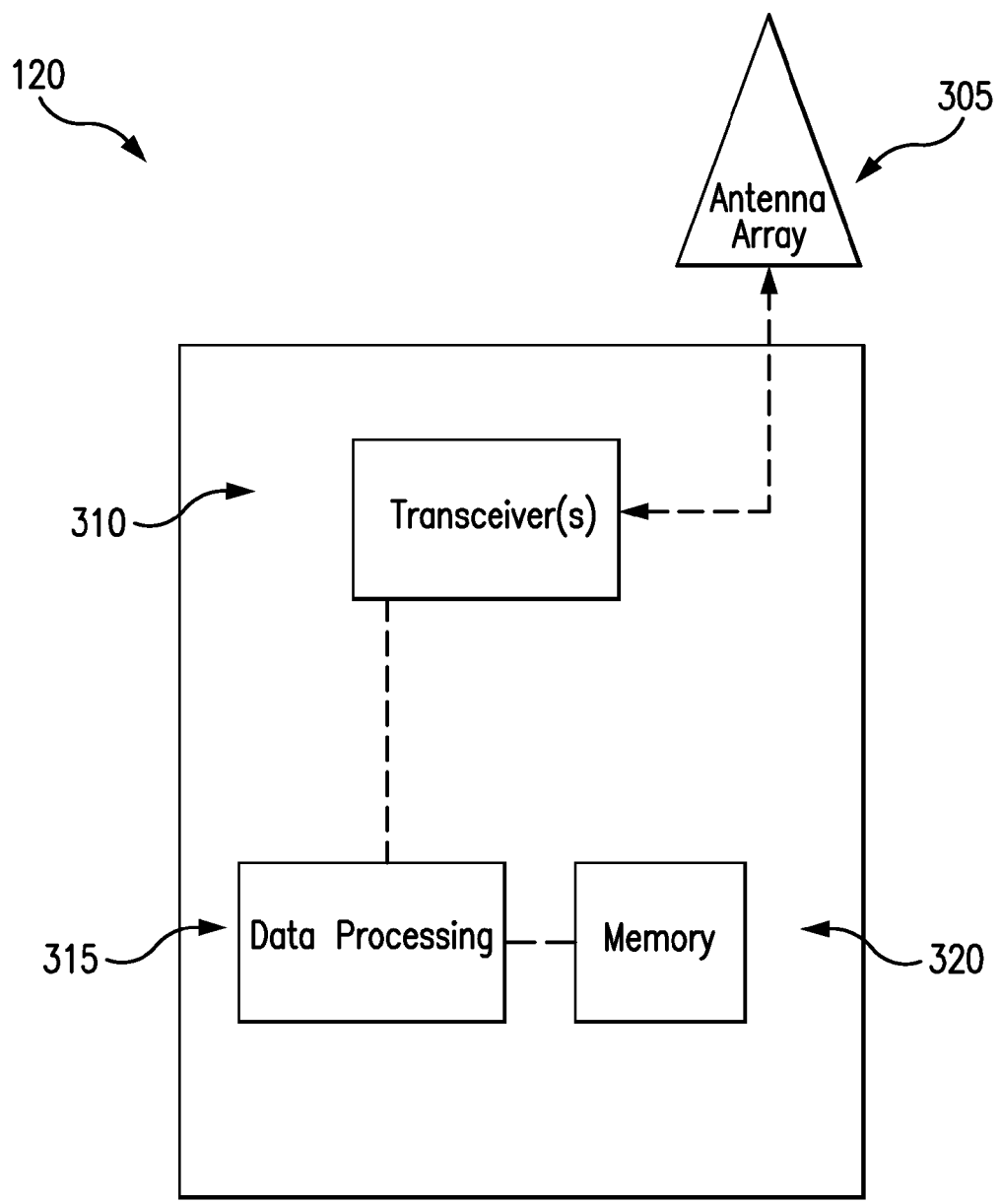
FIG. 3 is a block diagram of a mobile device, as used in the system of FIG. 1 in accordance with exemplary embodiments of the present invention.

Referring now to FIG. 3, a block diagram of a mobile device, as used in the system of FIG. 1 in accordance with exemplary embodiments of the present invention, is illustrated. As shown in FIG. 3, mobile device 120 may include: a data processing system 315, which may include one or more microprocessors and/or one or more circuits, such as an application specific integrated circuit (ASIC), field-programmable gate arrays (FPGAs), and the like; a transceiver 310 for transmitting data to (and receiving data from) nodes 110 and 115 via antenna array 305; and a memory 320, which may include one or more non-volatile storage devices and/or one or more volatile storage devices (e.g., random access memory (RAM)). In embodiments where data processing system 315 includes a microprocessor, computer readable program code may be stored in a computer readable medium, such as, but not limited, to magnetic media (e.g., a hard disk), optical media (e.g., a DVD), memory devices (e.g., random access memory), and the like. In some embodiments, computer readable program code is configured such that when executed by a processor, the code causes mobile device 120 to perform steps described below (e.g., steps described below with reference to the flow charts shown in FIGS. 5, 6, 11, 13, 15, 16, 18, 19 and 23). In other embodiments, mobile device 120 is configured to perform steps described above without the need for code. That is, for example, data processing system 315 may consist merely of one or more ASICs. Hence, the features of the present invention described above may be implemented in hardware and/or software. For example, in particular embodiments, the functional components of mobile device 120 described above may be implemented by data processing system 315 executing computer instructions, by data processing system 315 operating independent of any computer instructions, or by any suitable combination of hardware and/or software.

As described above, in the methods and devices described herein, radio resource management procedures in a mobile device are adjusted based on cell information determined using, in particular embodiments, one or more of reference signal power variation, reference signal quality variation, and signal to interference plus noise ratio variation. According to propagation modeling, the pathloss is a function of distance, frequency, antenna heights and correction factors due to terrain, buildings, structures and the like. The propagation properties are different in nodes 110, such as, for example, high power, and macrocell base stations and relay nodes, as compared with nodes 115, such as, for example, low power, micro, pico, and femto base stations and relay nodes. This difference in propagation properties affects the received power and signal quality in the downlink and, for a mobile device 120 moving at a certain speed in a heterogeneous network, the reference signal power, such as reference signal received power (RSRP), reference signal quality, such as reference signal received quality (RSRQ), and signal to interference plus noise ratio (SINR) variations differ between a node 110, such as a macrocell base station, and a node 115, such as a micro/pico/femto base station. Mobile devices 120 can use such information—for example, RSRP, RSRQ and/or SINR variations and—and speeds of movement of the mobile device 120, to determine cell information, such as cell size and cell type of the serving base station, in accordance with the methods described herein.

Figure 4:
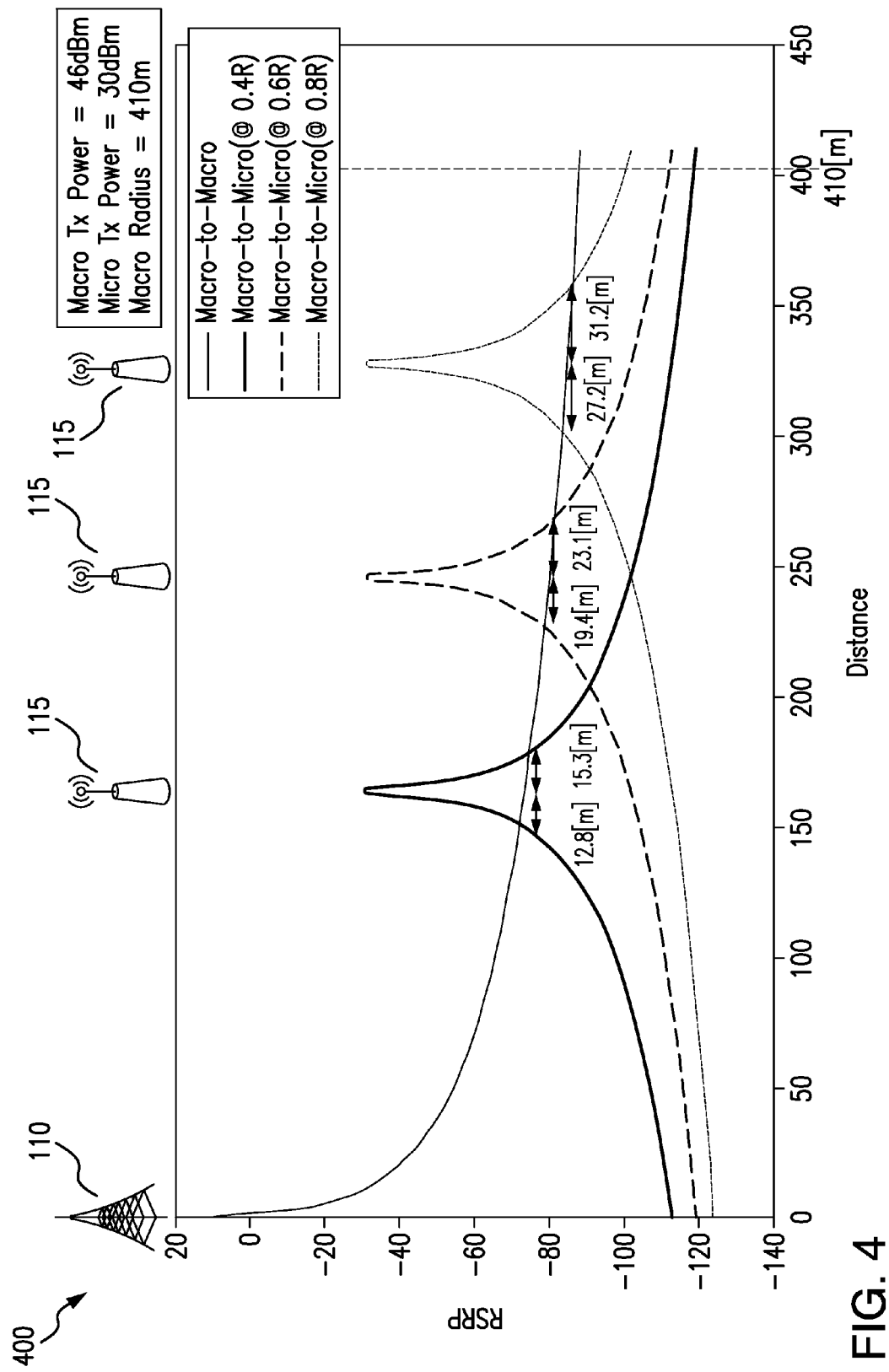
FIG. 4 is a graph illustrating exemplary variability of reference signal receive power (RSRP) values for a mobile device, communicating with different nodes, carrying out a method for adjusting resource management procedures in a mobile device communicating with a node operating in a cell in a heterogeneous communication network, in accordance with exemplary embodiments of the present invention.

Referring now to FIG. 4, a graph 400 illustrating exemplary variability of reference signal receive power (RSRP) values for a mobile device 120, communicating with different nodes 110 and 115, carrying out a method for adjusting resource management procedures in a mobile device communicating with a node operating in a cell in a heterogeneous communication network, in accordance with exemplary embodiments of the present invention, is shown. The graph illustrates that, when a mobile device moves a distance in relation to a node 110, such as a macrocell base station, as compared with a node 115, such as a micro/pico/femto base station, reference signal received power (RSRP) variability is different. The RSRP variability in relation to the nodes 115 is significantly greater than for the node 110. This similar behavior is observed for reference signal received quality (RSRQ) and signal to interference plus noise ratio (SINR).

Figure 5:
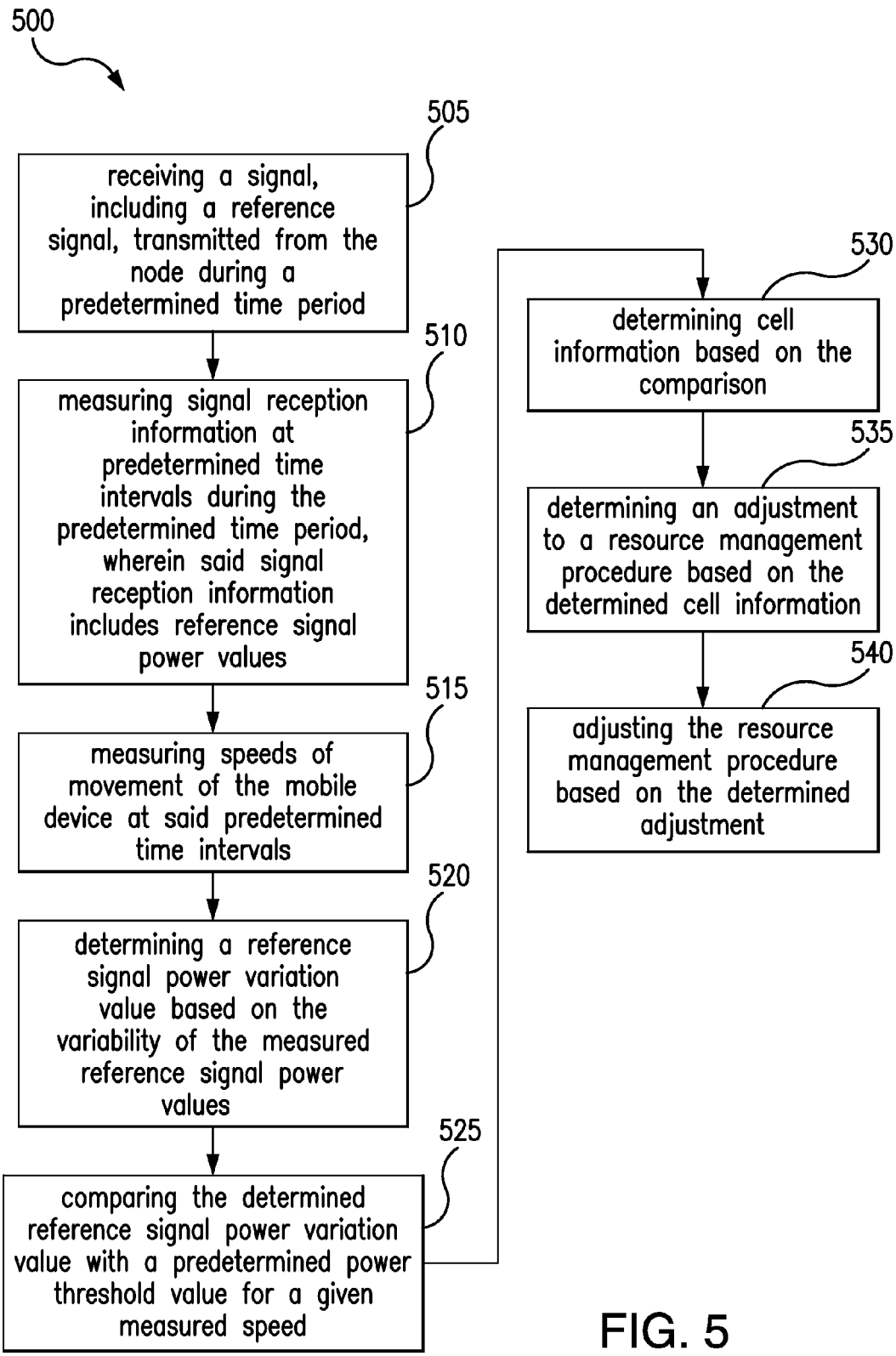
FIG. 5 is a flow chart illustrating the steps performed by a mobile device in a method for adjusting resource management procedures in a mobile device communicating with a node operating in a cell in a heterogeneous communication network using reference signal power variation, in accordance with exemplary embodiments of the present invention.

Referring now to FIG. 5, a flow chart illustrating the steps performed by a mobile device in a method for adjusting resource management procedures in a mobile device communicating with a node operating in a cell in a heterogeneous communication network using reference signal power variation, in accordance with exemplary embodiments of the present invention, is provided. In the first step 505, the mobile device 120 receives a signal, including a reference signal, transmitted from the node 110 or 115 during a predetermined time period. In step 510, the mobile device 120 measures signal reception information at predetermined time intervals during the predetermined time period. The signal reception information includes reference signal power values. In step 515, the mobile device 120 measures speeds of movement of the mobile device at the predetermined time intervals. In step 520, the mobile device determines a reference signal power variation value based on the variability of the measured reference signal power values. The mobile device 120, in step 525, then compares the determined reference signal power variation value with a predetermined power threshold value for a given measured speed. In step 530, the mobile device 120 determines cell information based on the comparison. The cell information may include information relating to cell size and cell type.

In step 535, the mobile device 120 determines an adjustment to a resource management procedure based on the determined cell information and, in step 540, adjusts the resource management procedure based on the determined adjustment.

In an exemplary embodiment, the resource management procedure may be a radio resource management procedure and adjusting the radio resource management procedure may include adjusting one or more of handover, uplink (UL) power control, radio link failure (RLF) recovery and link adaptation. In the case of adjusting handover, the adjustment may include one or more of setting the size of a measurement report, setting a value of a measurement gap, determining a Time-to-Trigger value, and determining a signal hysteresis value. Moreover, the radio resource management procedure may include setting the size of a measurement report for transmission to the node 110 or 115, and, based on whether the reference signal power variation value is greater than or less than the predetermined power threshold value, the size of the measurement report is adjusted to a minimum size or a standard size.

Figure 6:
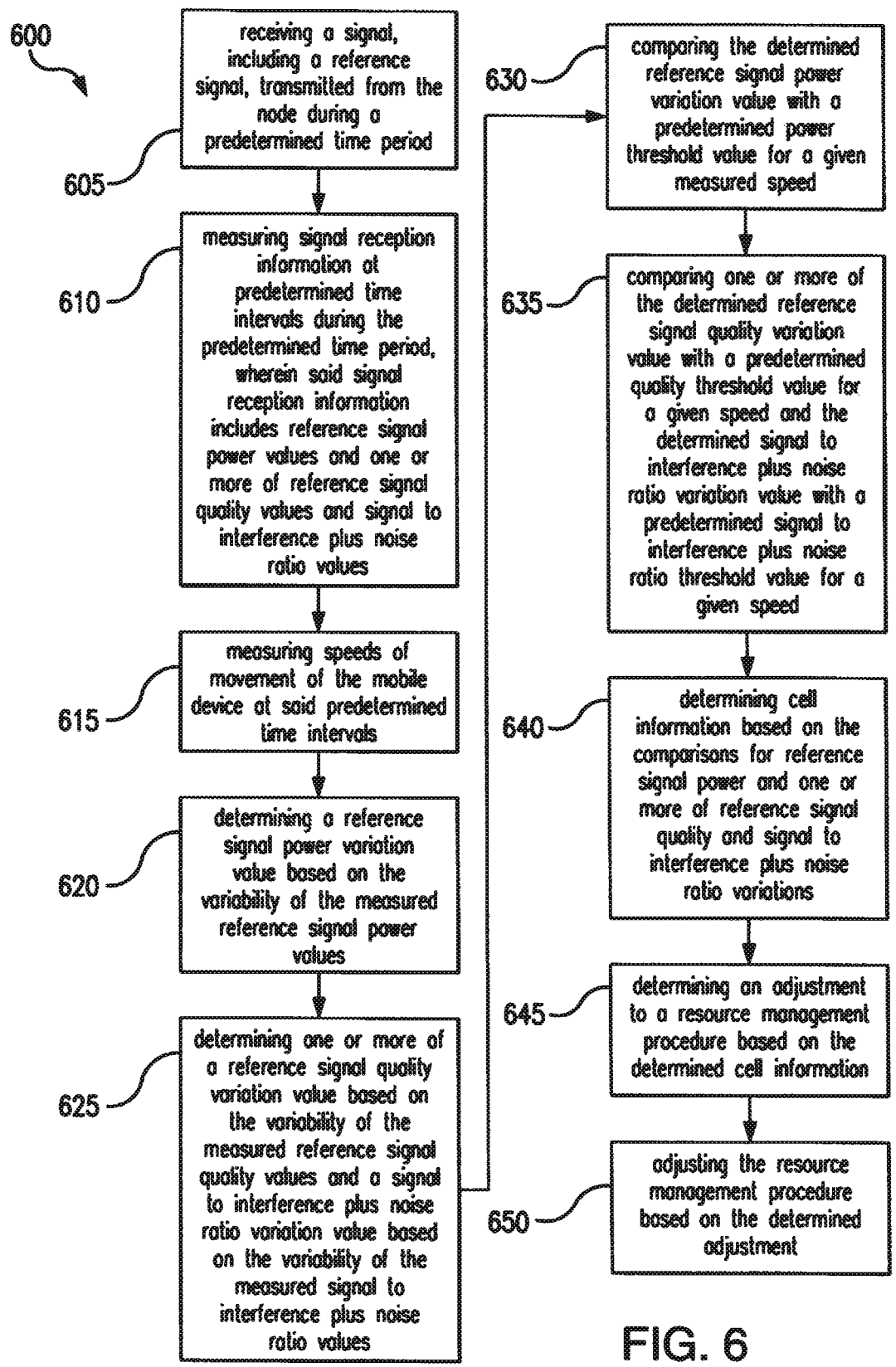
FIG. 6 is a flow chart illustrating the steps performed by a mobile device in a method for adjusting resource management procedures in a mobile device communicating with a node operating in a cell in a heterogeneous communication network using reference signal power variation and one or more of reference signal quality variation and signal to interference plus noise variation, in accordance with exemplary embodiments of the present invention.

In another exemplary embodiment, determining the cell information is based on comparisons for reference signal power and one or more of reference signal quality and signal to interference plus noise ratio variations. Referring now to FIG. 6, a flow chart illustrating the steps performed by a mobile device in a method for adjusting resource management procedures in a mobile device communicating with a node operating in a cell in a heterogeneous communication network using reference signal power variation and one or more of reference signal quality variation and signal to interference plus noise variation, in accordance with exemplary embodiments of the present invention, is shown. In the first step 605, the mobile device 120 receives a signal, including a reference signal, transmitted from the node 110 or 115 during a predetermined time period. In step 610, the mobile device 120 measures signal reception information at predetermined time intervals during the predetermined time period. The signal reception information includes reference signal power values and one or more of reference signal quality values and signal to interference plus noise ratio values. In step 615, the mobile device 120 measures speeds of movement of the mobile device at the predetermined time intervals. In step 620, the mobile device determines a reference signal power variation value based on the variability of the measured reference signal power values and, in step 625, determines one or more of a reference signal quality variation value based on the variability of the measured reference signal quality values and a signal to interference plus noise ratio variation value based on the variability of the measured signal to interference plus noise ratio values.

The mobile device 120, in step 630, then compares the determined reference signal power variation value with a predetermined power threshold value for a given measured speed and, in step 635, compares one or more of the determined reference signal quality variation value with a predetermined quality threshold value for a given speed and the determined signal to interference plus noise ratio variation value with a predetermined signal to interference plus noise ratio threshold value for a given speed. In step 640, the mobile device 120 determines cell information based on the comparisons for reference signal power and one or more of reference signal quality and signal to interference plus noise ratio variations. In step 645, the mobile device 120 determines an adjustment to a resource management procedure based on the determined cell information and, in step 650, adjusts the resource management procedure based on the determined adjustment.

As described above, in the methods and devices described herein, radio resource management procedures in a mobile device are adjusted based on cell information determined using, in particular embodiments, Doppler frequency shift with one or more of reference signal power variation, reference signal quality variation and signal to interference plus noise ratio variation. Doppler frequency shift changes differently (i.e., the Doppler frequency shift signature is different) when a mobile device 120 is communicating with a node 110, such as a macrocell base station, as compared with a node 115, such as a micro/pico/femto base station. When a mobile device 120 is communicating with a node 115, such as a micro/pico/femto base station, where there often is line-of-sight (LOS) propagation, the Doppler frequency shift varies significantly from positive to negative or negative to positive values. In contrast, when a mobile device 120 is communicating with a node 110, such as a macrocell base station, where there often is not line-of-sight (LOS) propagation, the Doppler frequency shift does not vary significantly from positive to negative or negative to positive values, but follows continuous-like line variations.

Figure 7:
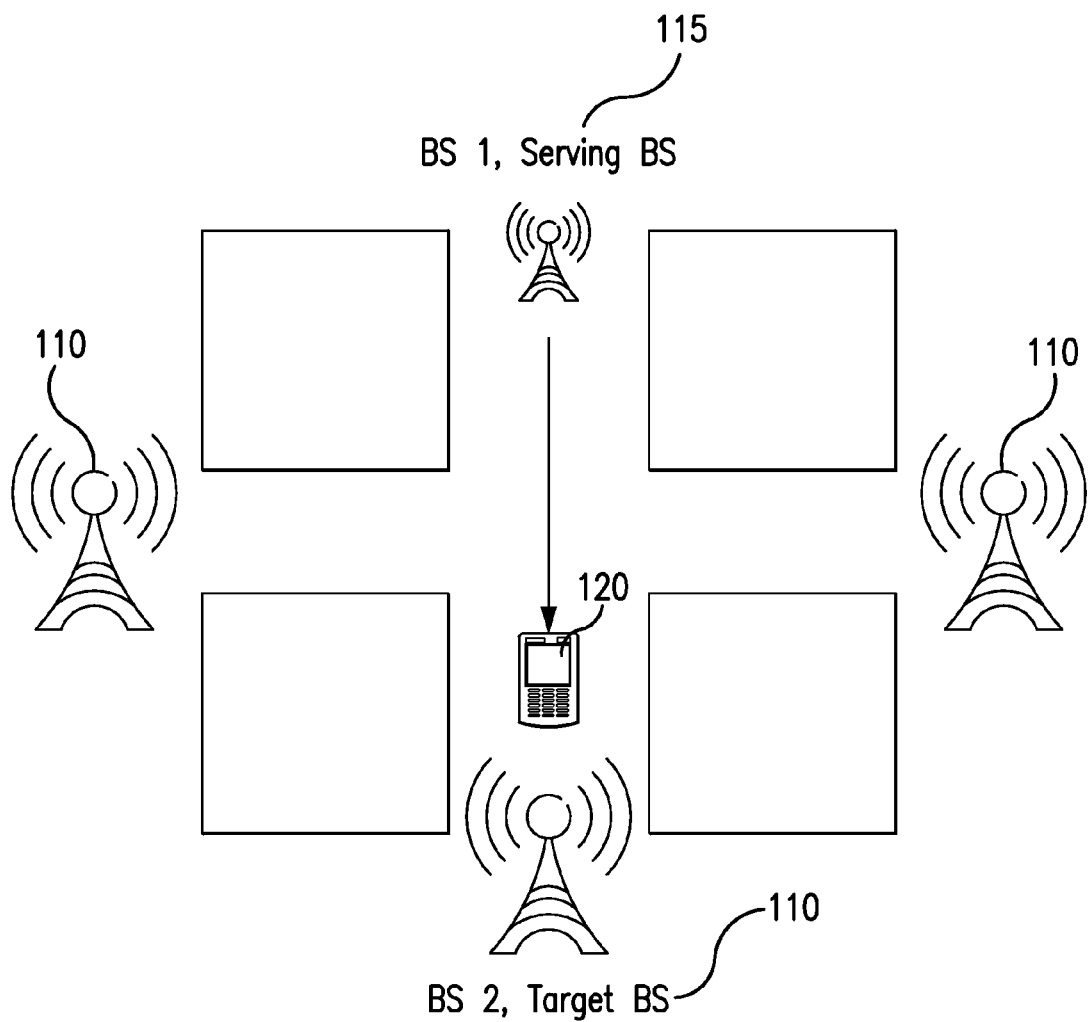
FIG. 7 is a diagram illustrating a first exemplary movement pattern of a mobile device, and line of sight to different nodes, carrying out a method for adjusting resource management procedures in a mobile device communicating with a node operating in a cell in a heterogeneous communication network, in accordance with exemplary embodiments of the present invention.

FIG. 7 is a diagram illustrating a first exemplary movement pattern of a mobile device 120, and line of sight to different nodes 110 and 115, carrying out a method for adjusting resource management procedures in a mobile device communicating with a node operating in a cell in a heterogeneous communication network, in accordance with exemplary embodiments of the present invention. As shown in FIG. 7, mobile device 120 is moving in a straight line in relation to node 115 and there is line-of-sight (LOS) with node 115.

Figure 8:
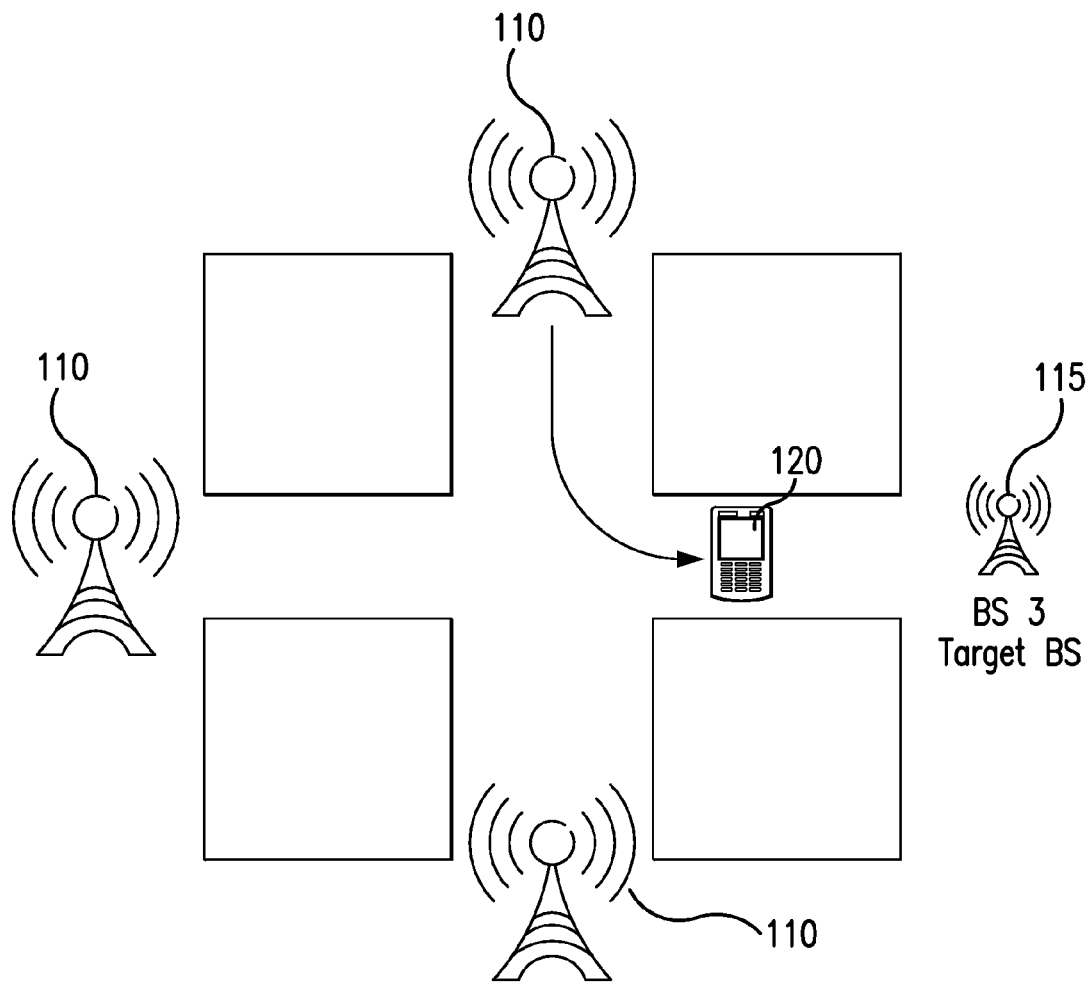
FIG. 8 is a diagram illustrating a second exemplary movement pattern of a mobile device, and line of sight to different nodes, carrying out a method for adjusting resource management procedures in a mobile device communicating with a node operating in a cell in a heterogeneous communication network, in accordance with exemplary embodiments of the present invention.

FIG. 8 is a diagram illustrating a second exemplary movement pattern of a mobile device 120, and line-of-sight to different nodes 110 and 115, carrying out a method for adjusting resource management procedures in a mobile device communicating with a node operating in a cell in a heterogeneous communication network, in accordance with exemplary embodiments of the present invention. As shown in FIG. 8, mobile device 120 is not moving in a straight line, but in random direction, in relation to node 110, and there is not line-of-sight (LOS) with node 110.

Figure 9:
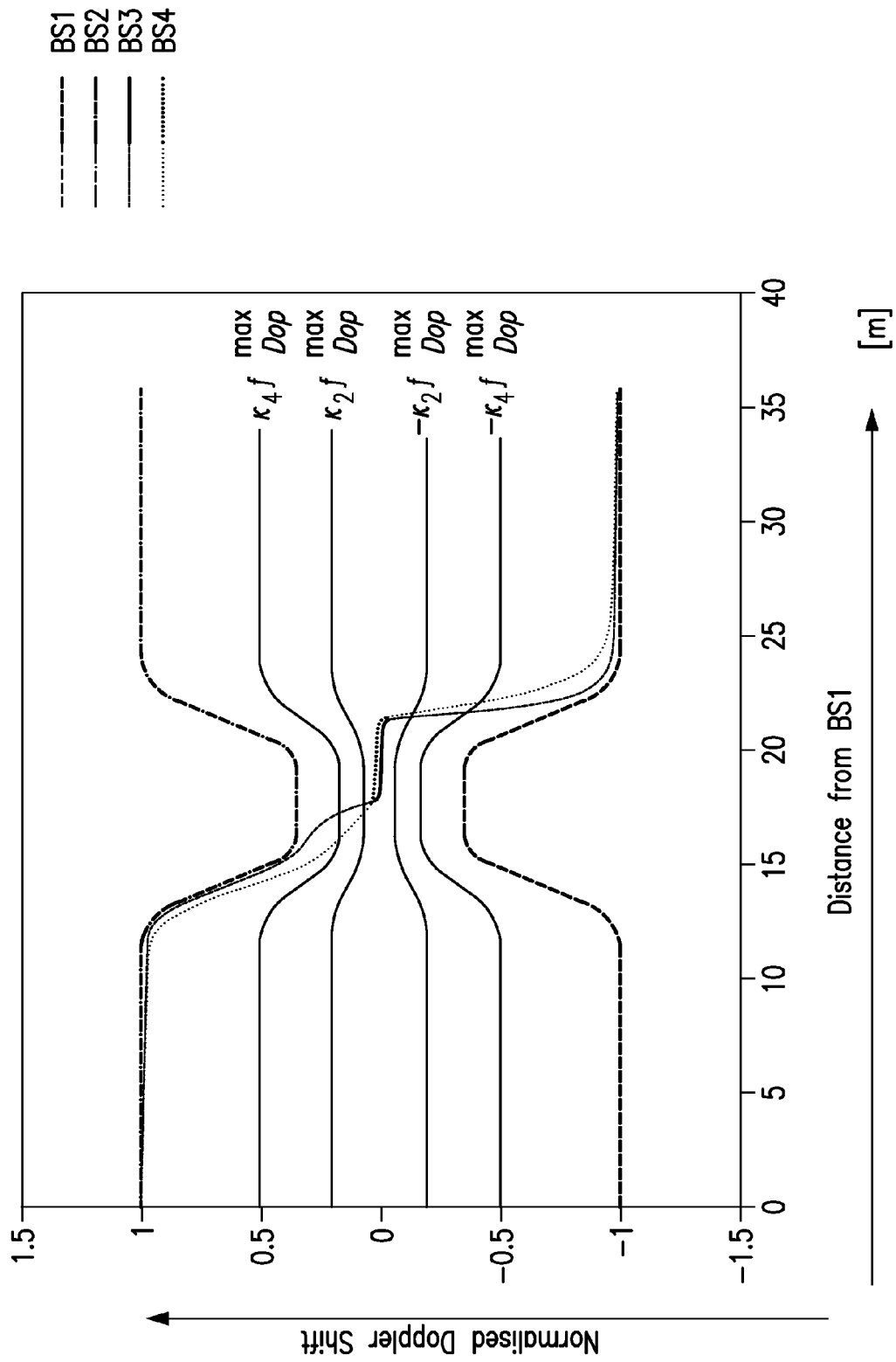
FIG. 9 is a graph illustrating first exemplary Doppler frequency shift signatures for different movement patterns of a mobile device, in relation to different nodes, carrying out a method for adjusting resource management procedures in a mobile device communicating with a node operating in a cell in a heterogeneous communication network, in accordance with exemplary embodiments of the present invention.

Referring to FIG. 9, a graph illustrating first exemplary Doppler frequency shift signatures for different movement patterns of a mobile device 120, in relation to different nodes 110 and 115, carrying out a method for adjusting resource management procedures in a mobile device communicating with a node operating in a cell in a heterogeneous communication network, in accordance with exemplary embodiments of the present invention, is provided. FIG. 9 illustrates that, when a mobile device 120 is communicating with a node 115, such as a micro/pico/femto base station, where there is line-of-sight (LOS) propagation, the Doppler frequency shift varies significantly from positive to negative or negative to positive values.

Figure 10:
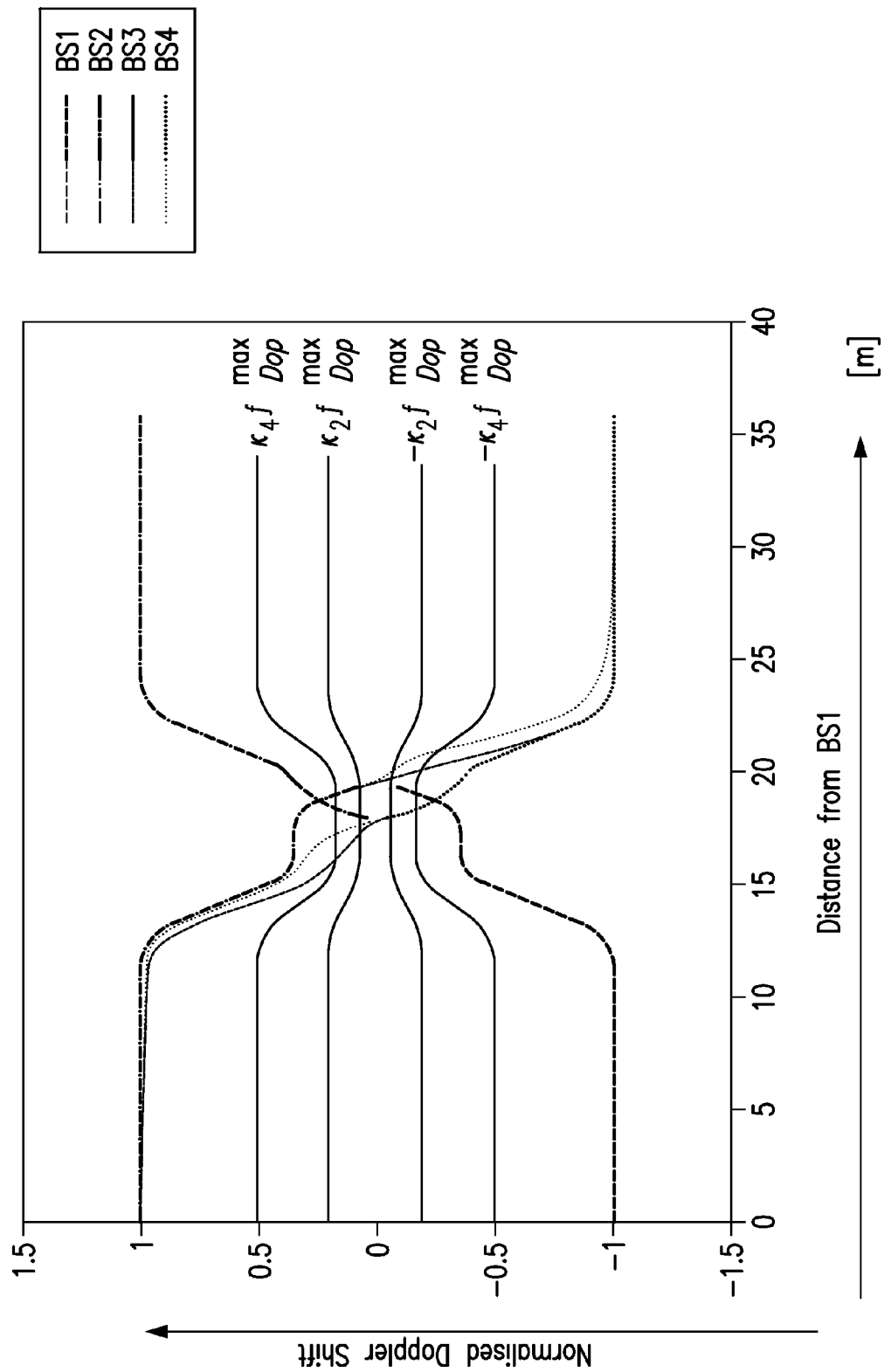
FIG. 10 is a graph illustrating second exemplary Doppler frequency shift signatures for different movement patterns of a mobile device, in relation to different nodes, carrying out a method for adjusting resource management procedures in a mobile device communicating with a node operating in a cell in a heterogeneous communication network, in accordance with exemplary embodiments of the present invention.

FIG. 10 is a graph illustrating second exemplary Doppler frequency shift signatures for different movement patterns of a mobile device 120, in relation to different nodes 110 and 115, carrying out a method for adjusting resource management procedures in a mobile device communicating with a node operating in a cell in a heterogeneous communication network, in accordance with exemplary embodiments of the present invention. FIG. 10 illustrates that, when a mobile device 120 is communicating with a node 110, such as a macrocell base station, where there is not line-of-sight (LOS) propagation, the Doppler frequency shift does not vary significantly from positive to negative or negative to positive values, as with the micro/pico/femto base station where this is LOS, but follows continuous-like line variations.

Accordingly, by evaluating the signature of the Doppler frequency shift, a determination can be made of whether the mobile device 120 is or is not in line-of-sight (LOS) with the node 110 or 115 it is currently communicating with (i.e., the serving BS). As discussed above, for a node 115, such as a micro/pico/femto base station, there likely is line-of-sight (LOS). In contrast, for a node 110, such as a macrocell base station, there likely is not line-of-sight (LOS) because, typically, such macrocell base stations are placed on rooftops of tall buildings and the signal from them arrives to mobile devices diffracted and refracted. Thus, information indicative of the cell size and cell type can be determined by the mobile device 120 by evaluating the signature of the Doppler frequency shift and determining whether the mobile device 120 is or is not in line-of-sight (LOS) with the node 110 or 115.

Figure 11:
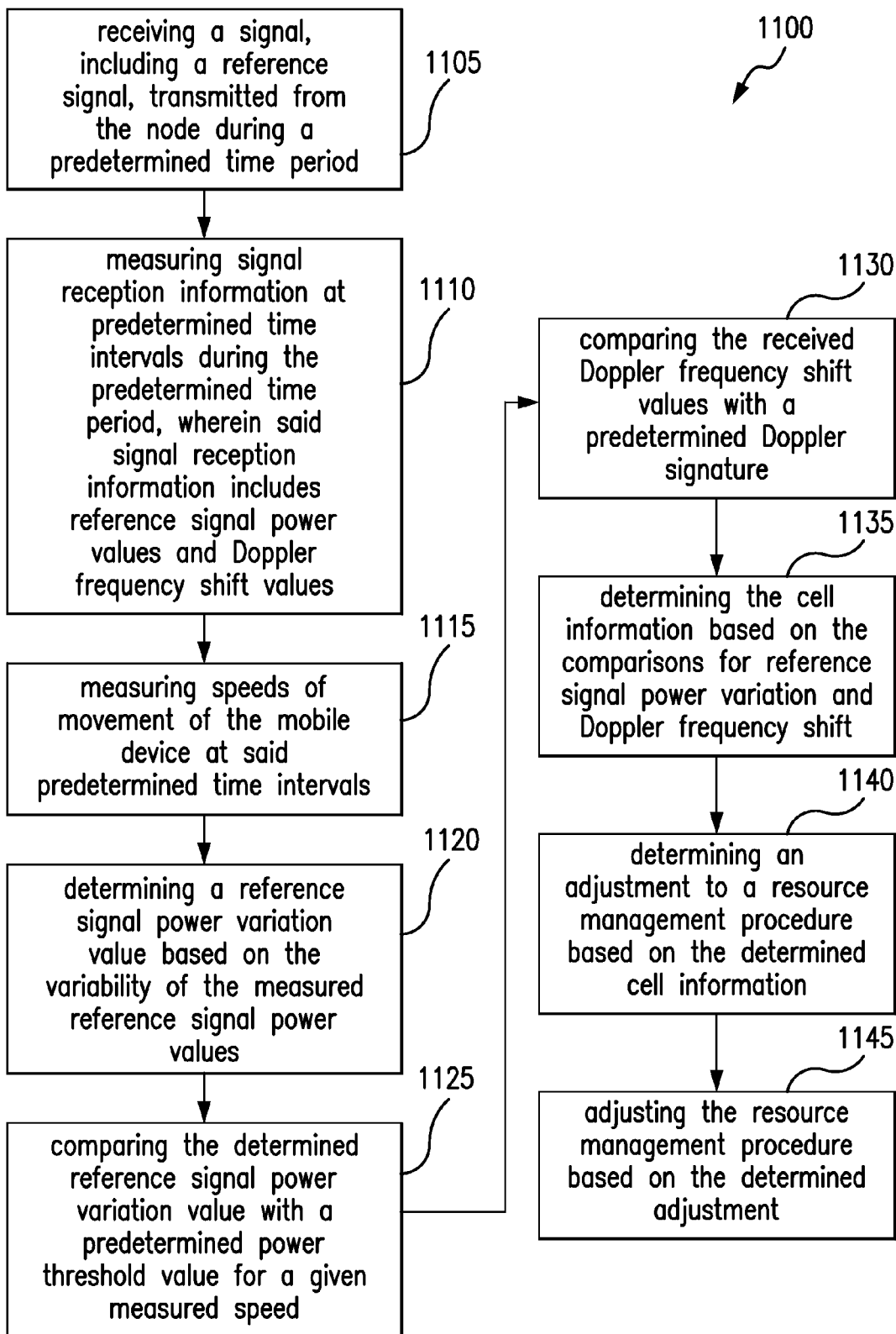
FIG. 11 is a flow chart illustrating the steps performed by a mobile device in a method for adjusting resource management procedures in a mobile device communicating with a node operating in a cell in a heterogeneous communication network using reference signal power variation and Doppler frequency shift, in accordance with exemplary embodiments of the present invention.

Referring now to FIG. 11, a flow chart illustrating the steps performed by a mobile device in a method for adjusting resource management procedures in a mobile device communicating with a node operating in a cell in a heterogeneous communication network using reference signal power variation and Doppler frequency shift, in accordance with exemplary embodiments of the present invention, is provided. In the first step 1105, the mobile device 120 receives a signal, including a reference signal, transmitted from the node 110 or 115 during a predetermined time period. In step 1110, the mobile device 120 measures signal reception information at predetermined time intervals during the predetermined time period. The signal reception information includes reference signal power values and Doppler frequency shift values. In step 1115, the mobile device 120 measures speeds of movement of the mobile device at the predetermined time intervals. In step 1120, the mobile device determines a reference signal power variation value based on the variability of the measured reference signal power values.

The mobile device 120, in step 1125, then compares the determined reference signal power variation value with a predetermined power threshold value for a given measured speed and, in step 1130, compares the received Doppler frequency shift values with a predetermined Doppler signature. In step 1135, the mobile device 120 determines cell information based on the comparisons for reference signal power variation and Doppler frequency shift. In step 1140, the mobile device 120 determines an adjustment to a resource management procedure based on the determined cell information and, in step 1145, adjusts the resource management procedure based on the determined adjustment.

As described above, in the methods and devices described herein, radio resource management procedures in a mobile device are adjusted based on cell information determined using, in particular embodiments, antenna location with one or more of reference signal power variation, reference signal quality variation and signal to interference plus noise ratio variation. For a macro cell in heterogeneous networks, cell radius varies from about 500 meters up to many kilometers, and macrocell base station antennas are normally at a high level mounted on high buildings or masts. For a micro cell, the cell radius is on the order of a few hundred meters, and the micro/pico/femto cell base station antennas are normally lower than the buildings and, in most cases, such micro/pico/femto cell base stations are placed at ground level. In addition, antenna heights for micro/pico/femto cell base stations are even lower. Thus, in accordance with an exemplary embodiment of the present invention described below, information indicative of the cell size and cell type can be determined by the mobile device 120 by estimating the vertical angle of arrival of the received signal. If the estimated angle indicates an antenna at the node 110 or 115 located above a predetermined height or elevation, then it indicates that the cell in which the mobile device 120 is located is a macro cell. If the estimated angle indicates an antenna at the node 110 or 115 located below a predetermined height or elevation threshold, then it indicates that the cell in which the mobile device 120 is located is a micro/pico/femto cell.

Figure 12:
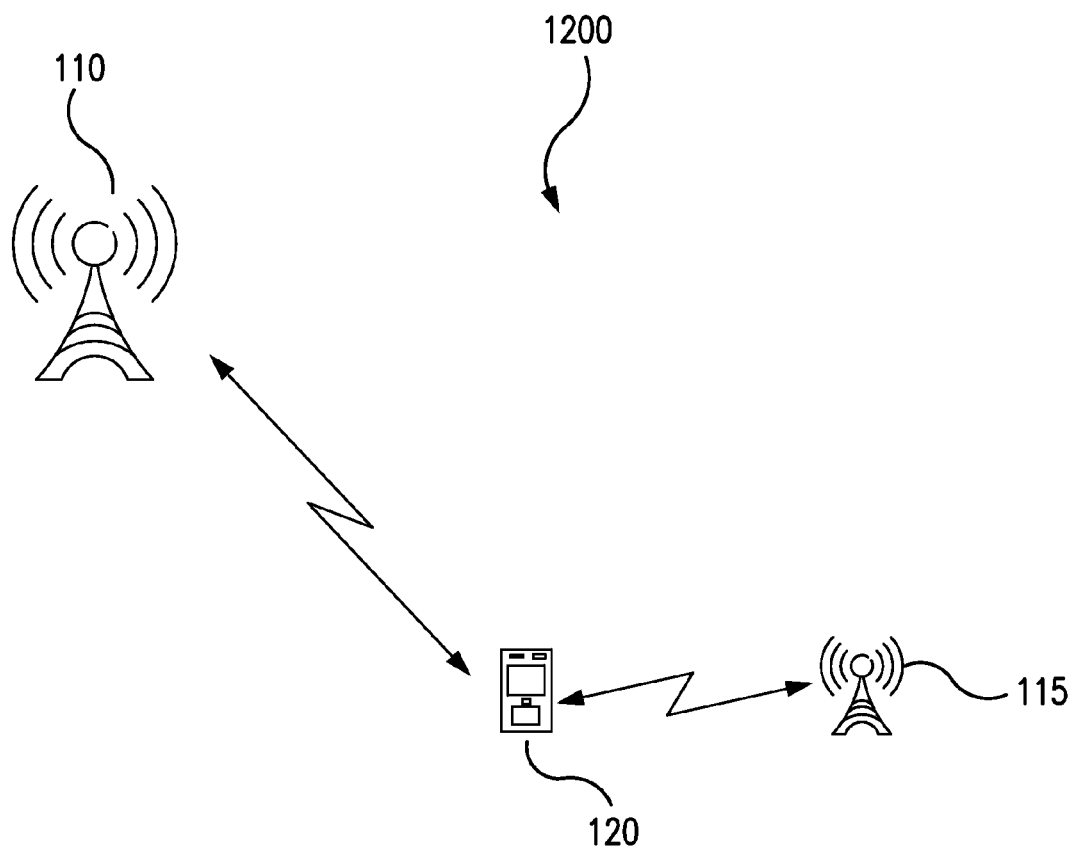
FIG. 12 is diagram illustrating the vertical angle of arrival of signals received by a mobile device, from different nodes, carrying out a method for adjusting resource management procedures in a mobile device communicating with a node operating in a cell in a heterogeneous communication network, in accordance with exemplary embodiments of the present invention.

FIG. 12 is diagram illustrating the vertical angle of arrival of signals received by a mobile device 120, from different nodes 110 and 115, carrying out a method for adjusting resource management procedures in a mobile device communicating with a node operating in a cell in a heterogeneous communication network, in accordance with exemplary embodiments of the present invention.

Figure 13:
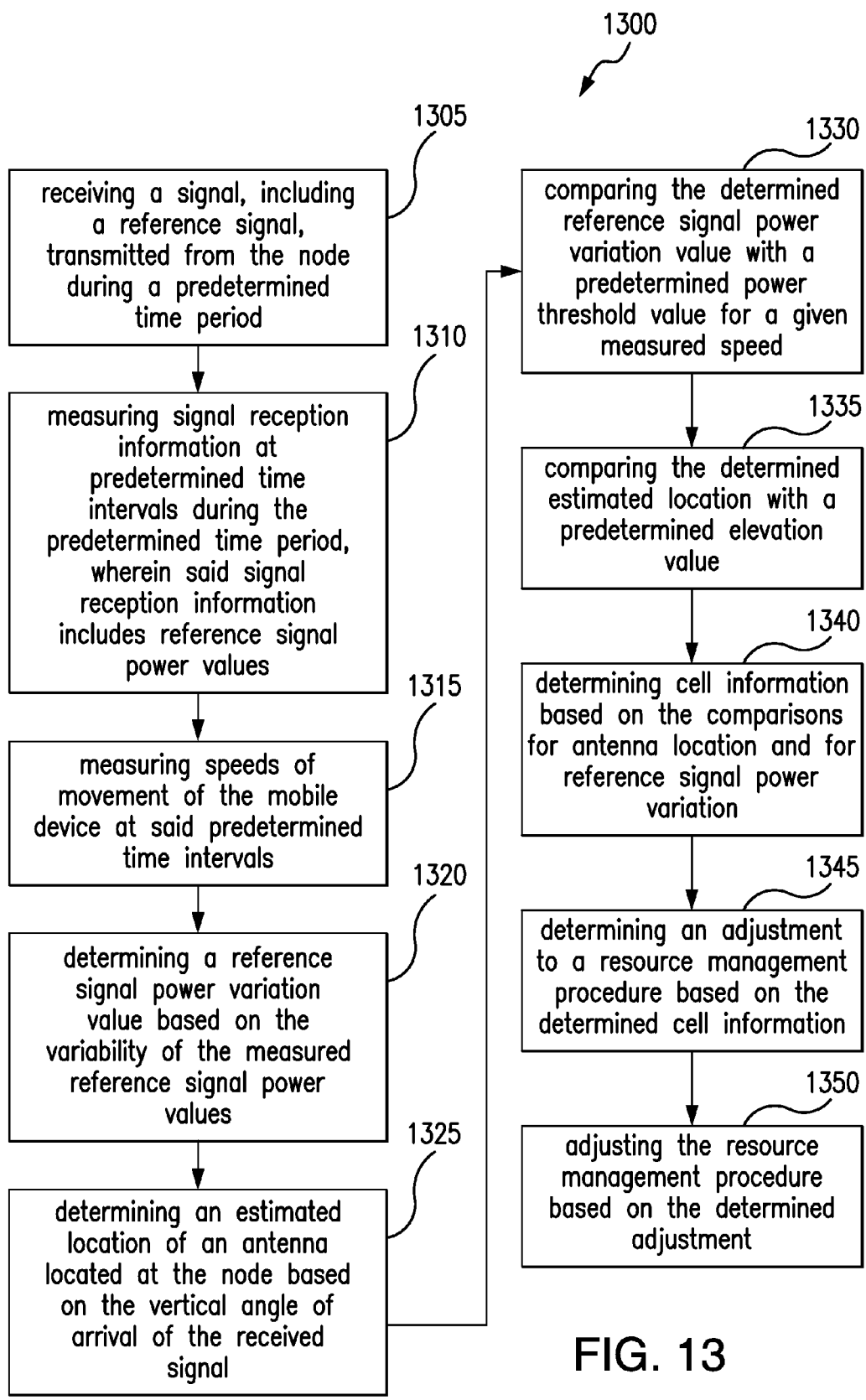
FIG. 13 is a flow chart illustrating the steps performed by a mobile device in a method for adjusting resource management procedures in a mobile device communicating with a node operating in a cell in a heterogeneous communication network using antenna location and reference signal power variation, in accordance with exemplary embodiments of the present invention.

Referring now to FIG. 13, a flow chart illustrating the steps performed by a mobile device 120 in a method for adjusting resource management procedures in a mobile device communicating with a node operating in a cell in a heterogeneous communication network using antenna location and reference signal power variation, in accordance with exemplary embodiments of the present invention, is provided. In the first step 1305, the mobile device 120 receives a signal, including a reference signal, transmitted from the node 110 or 115 during a predetermined time period. In step 1310, the mobile device 120 measures signal reception information at predetermined time intervals during the predetermined time period. The signal reception information includes reference signal power values. In step 1315, the mobile device 120 measures speeds of movement of the mobile device at the predetermined time intervals. In step 1320, the mobile device determines a reference signal power variation value based on the variability of the measured reference signal power values.

The mobile device 120, in step 1325, determines an estimated location of an antenna located at the node 110 or 115 based on the vertical angle of arrival of the received signal. In a particular embodiment, the vertical angle of arrival of the received signal can be estimated by measuring position information at said predetermined time intervals to obtain 3D coordinate values for the mobile device 120 and estimating the vertical angle of arrival of the received signal which may be based on the 3D coordinate values.

In step 1330, the mobile device 120 compares the determined reference signal power variation value with a predetermined power threshold value for a given measured speed and, in step 1335, compares the determined estimated location with a predetermined elevation value. In step 1340, the mobile device 120 determines cell information based on the comparisons for antenna location and for reference signal power variation. In step 1345, the mobile device 120 determines an adjustment to a resource management procedure based on the determined cell information and, in step 1350, adjusts the resource management procedure based on the determined adjustment.

As described above, in the methods and devices described herein, radio resource management procedures in a mobile device are adjusted based on cell information determined using, in particular embodiments, handover triggers, alone or with one or more of reference signal power variation, reference signal quality variation and signal to interference plus noise ratio variation. Handover triggers are transmitted to the mobile device 120 by a node 110 or 115 in the measurement configuration via radio resource control (RRC) signaling. The configured handover triggers are different in large cells (i.e., macrocells) and small cells (i.e., micro/pico/femto cells). Thus, the mobile device 120, by evaluating received radio resource control (RRC) measurement configuration messages including information relating to handover triggers, can determine cell information, such as cell size and cell type, based on the handover triggers. For example, where the mobile device 120 is performing HO from cell A to cell B, if, upon entering the new cell B, the mobile device 120 receives a new set of HO triggers different than the ones used in the previous serving cell A, then this is an indication that the cell size and cell type of the new serving cell B might be different from the cell size and cell type of the previous serving cell A. For example, if the new HO triggers are more aggressive than the previous ones because, for example, the HO margin and time-to-trigger (TTT) values are smaller than the ones used in the previous serving cell, then this is an indication that the current serving cell B is smaller than the previous serving cell A (assuming that the mobile device speed is constant throughout the observation period).

Figure 14:
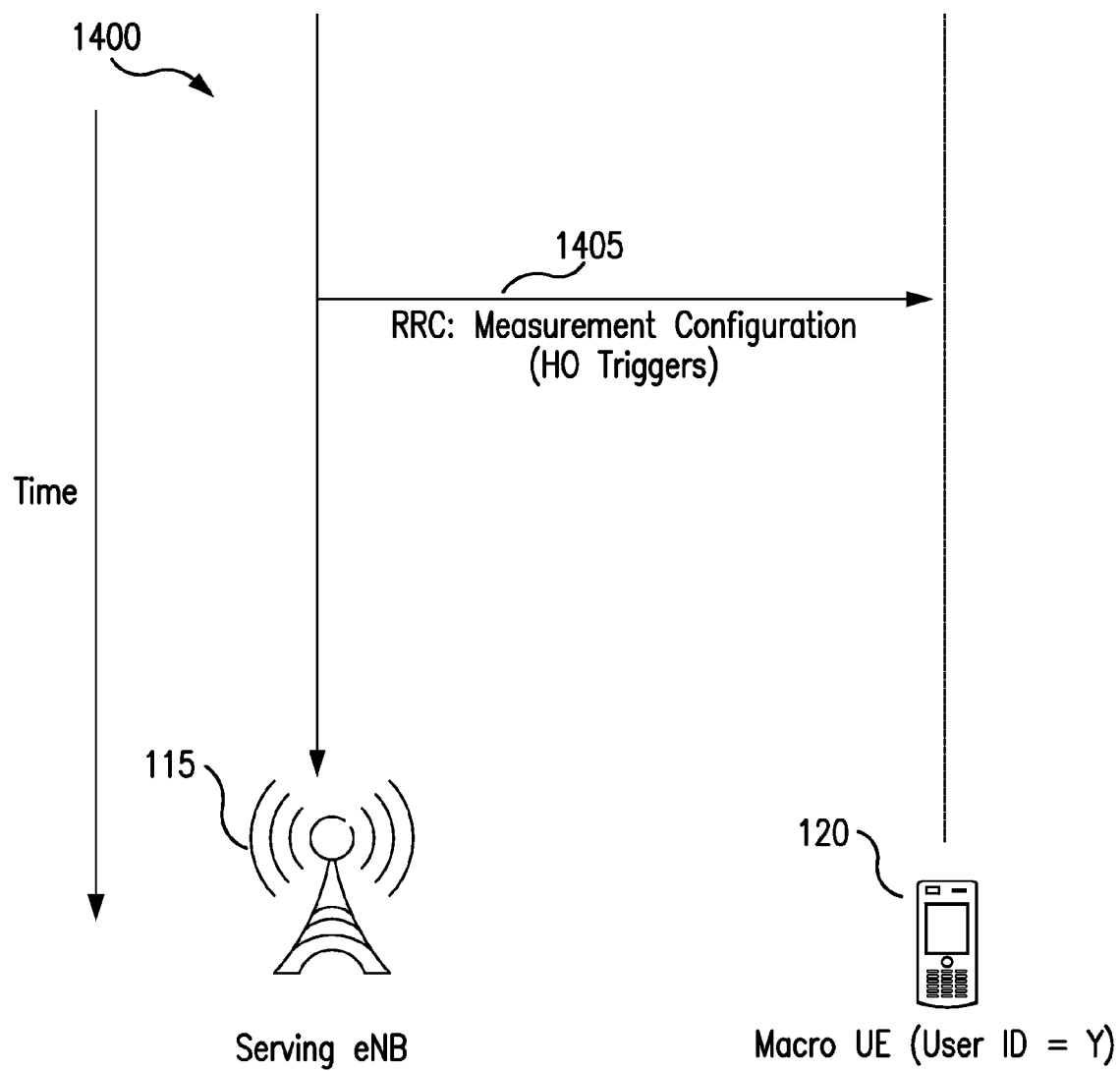
FIG. 14 is a time sequence diagram illustrating a first exemplary using radio resource control (RRC) messaging flow for a mobile device carrying out a method for adjusting resource management procedures in a mobile device communicating with a node operating in a cell in a heterogeneous communication network, in accordance with exemplary embodiments of the present invention.

Referring now to FIG. 14, a time sequence diagram illustrating a first exemplary using radio resource control (RRC) messaging flow for a mobile device carrying out a method for adjusting resource management procedures in a mobile device communicating with a node operating in a cell in a heterogeneous communication network, in accordance with exemplary embodiments of the present invention, is shown. In one embodiment, serving eNB 115 sends a radio resource control (RRC) measurement configuration message 1405, including information relating to handover triggers, to mobile device 120. This information relating to handover triggers is then utilized by the mobile device 120 to determine whether to adjust radio resource management procedures such as, for example, setting the size of a measurement report, setting the value of measurement gap, determining a Time-to-Trigger value, and determining a signal hysteresis value, in the mobile device 120 by, for example, adjusting one or more of handover, uplink (UL) power control, radio link failure (RLF) recovery and link adaptation.

Figure 15:
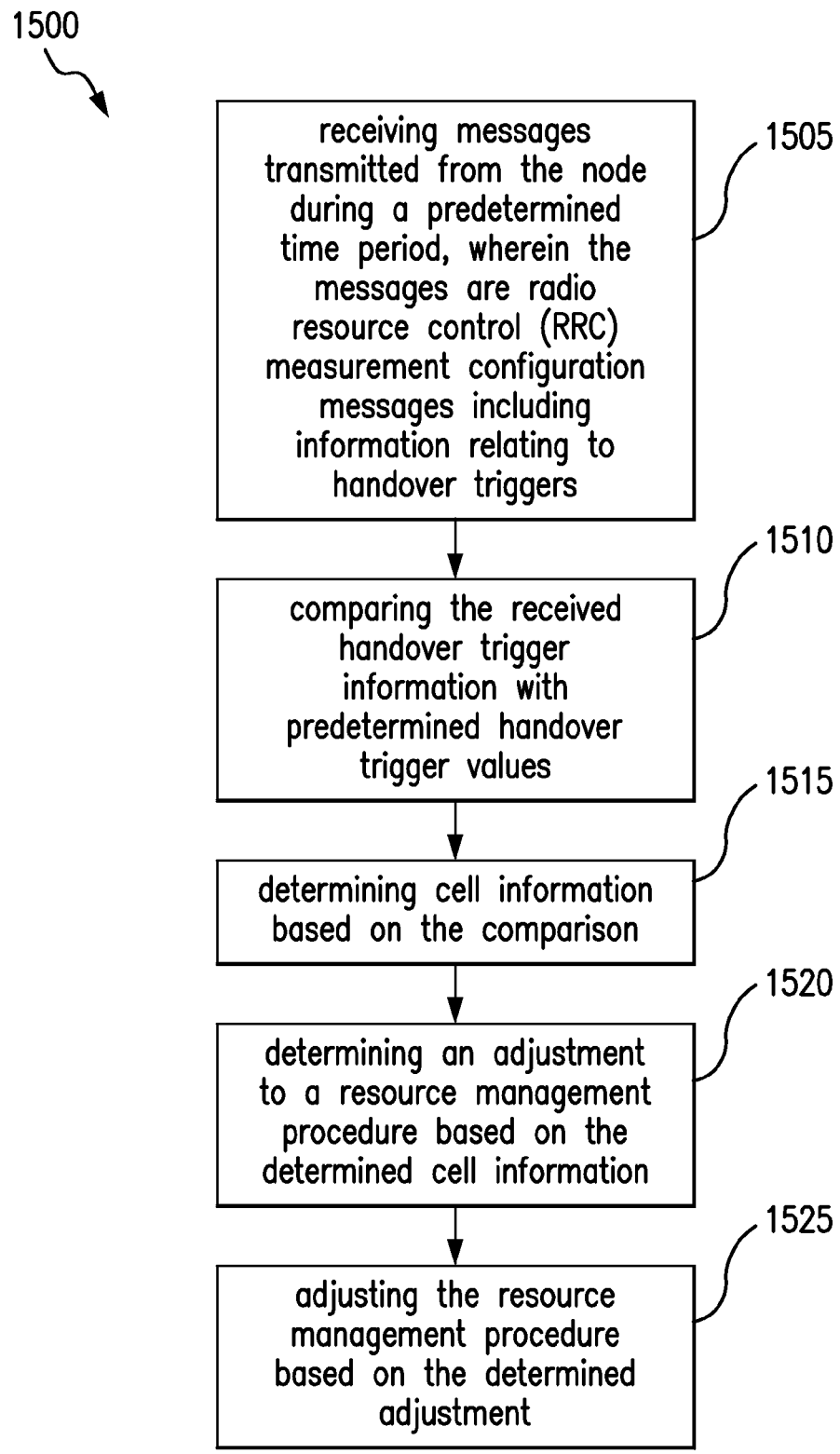
FIG. 15 is a flow chart illustrating the steps performed by a mobile device in a method for adjusting resource management procedures in a mobile device communicating with a node operating in a cell in a heterogeneous communication network using handover triggers, in accordance with exemplary embodiments of the present invention.

Referring to FIG. 15, a flow chart illustrating the steps performed by a mobile device in a method for adjusting resource management procedures in a mobile device communicating with a node operating in a cell in a heterogeneous communication network using handover triggers, in accordance with exemplary embodiments of the present invention, is provided. In the first step 1505, the mobile device 120 receives messages transmitted from the node 110 or 115 during a predetermined time period. The messages are radio resource control (RRC) measurement configuration messages including information relating to handover triggers. In particular embodiments, the handover trigger information and predetermined handover trigger values include information relating to one or more of handover margin and time to trigger values.

In step 1510, the mobile device 120 compares the received handover trigger information with predetermined handover trigger values. In step 1515, the mobile device 120 determines cell information based on the comparison. In step 1520, the mobile device 120 determines an adjustment to a resource management procedure based on the determined cell information and, in step 1525, adjusts the resource management procedure based on the determined adjustment.

Figure 16:
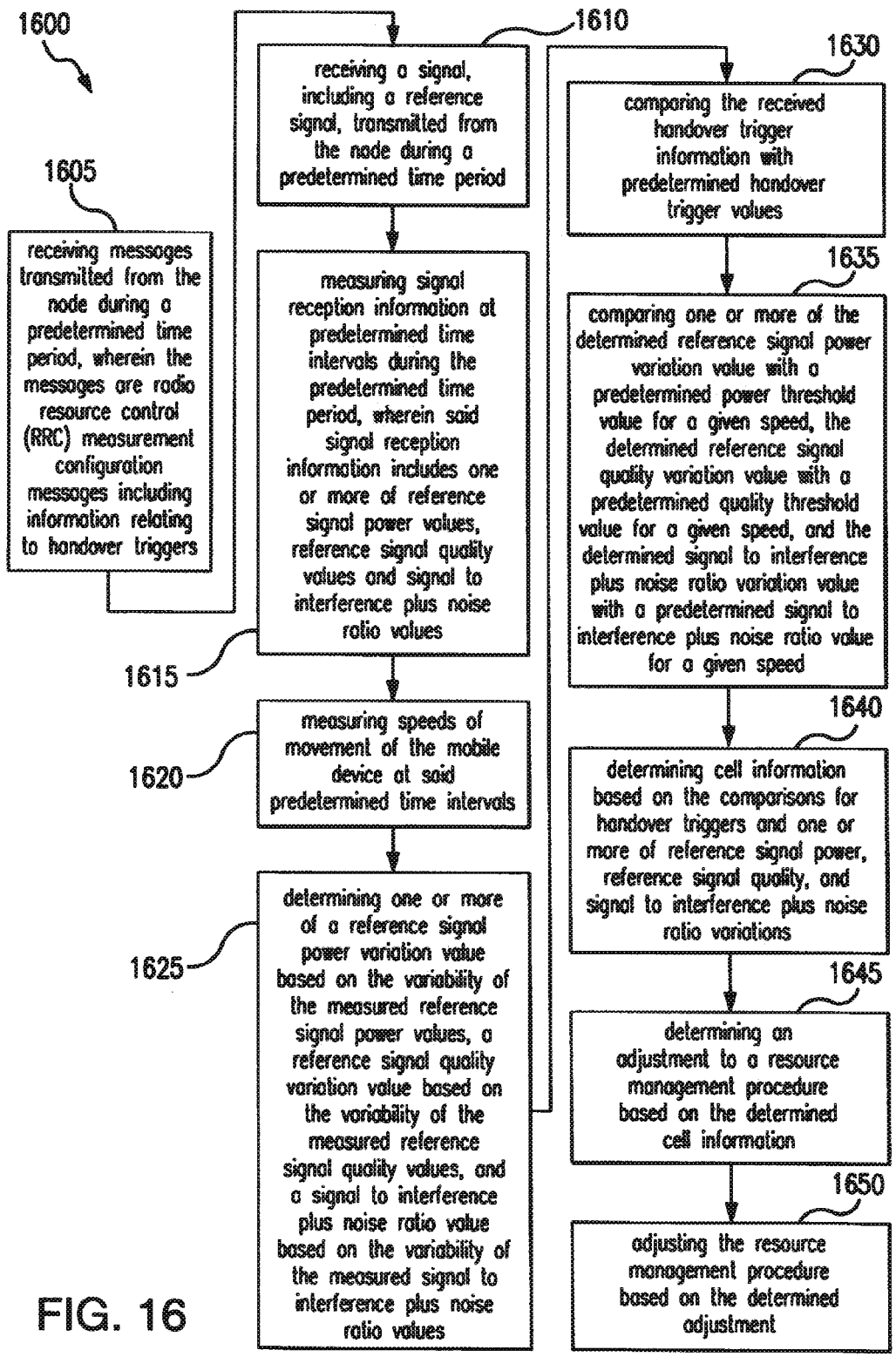
FIG. 16 is a flow chart illustrating the steps performed by a mobile device in a method for adjusting resource management procedures in a mobile device communicating with a node operating in a cell in a heterogeneous communication network using handover triggers and one or more of reference signal power variation, reference signal quality variation and signal to interference plus noise variation, in accordance with exemplary embodiments of the present invention.

FIG. 16 is a flow chart illustrating the steps performed by a mobile device in a method for adjusting resource management procedures in a mobile device communicating with a node operating in a cell in a heterogeneous communication network using handover triggers and one or more of reference signal power variation, reference signal quality variation and signal to interference plus noise variation, in accordance with exemplary embodiments of the present invention. In the first step 1605, the mobile device 120 receives messages transmitted from the node 110 or 115 during a predetermined time period. The messages are radio resource control (RRC) measurement configuration messages including information relating to handover triggers. In step 1610, the mobile device 120 receives a signal, including a reference signal, transmitted from the node 110 or 115 during a predetermined time period. In step 1615, the mobile device 120 measures signal reception information at predetermined time intervals during the predetermined time period. The signal reception information includes one or more of reference signal power values, reference signal quality values and signal to interference plus noise ratio values. In step 1620, the mobile device 120 measures speeds of movement of the mobile device at the predetermined time intervals. In step 1625, the mobile device determines one or more of a reference signal power variation value based on the variability of the measured reference signal power values, a reference signal quality variation value based on the variability of the measured reference signal quality values and a signal to interference plus noise ratio variation value based on the variability of the measured signal to interference plus noise ratio values.

In step 1630, the mobile device 120 compares the received handover trigger information with predetermined handover trigger values. The mobile device 120, in step 1635, then compares one or more of the determined reference signal power variation value with a predetermined power threshold value for a given measured speed, the determined reference signal quality variation value with a predetermined quality threshold value for a given speed and the determined signal to interference plus noise ratio variation value with a predetermined signal to interference plus noise ratio threshold value for a given speed. In step 1640, the mobile device 120 determines cell information based on the comparisons for handover triggers and one or more of reference signal power, reference signal quality and signal to interference plus noise ratio variations. In step 1645, the mobile device 120 determines an adjustment to a resource management procedure based on the determined cell information and, in step 1650, adjusts the resource management procedure based on the determined adjustment.

As described above, in the methods and devices described herein, radio resource management procedures in a mobile device are adjusted based on cell information determined using, in particular embodiments, cell signal power, alone or with one or more of reference signal power variation, reference signal quality variation and signal to interference plus noise ratio variation. As discussed above, power outputs differ for a macrocell base station as compared with a micro/pico/femto cell base station. In the LTE system, the Cell Reference Signal (CRS) power is differing for various types of base stations in heterogeneous networks. According to 3GPP TS 36.331, a parameter referenceSignalPower is included in IE PDSCH-ConfigCommon (of the IE RadioResourceConfigCommonSIB), which is transmitted to a UE mobile device 120 via System Information Blocks (SIBs), such as System Information Block Type 2 (SIB2). Accordingly, the mobile device 120 can detect the cell size and cell type of the serving eNB based on this parameter, in accordance with the exemplary method of the present invention.

Figure 17:
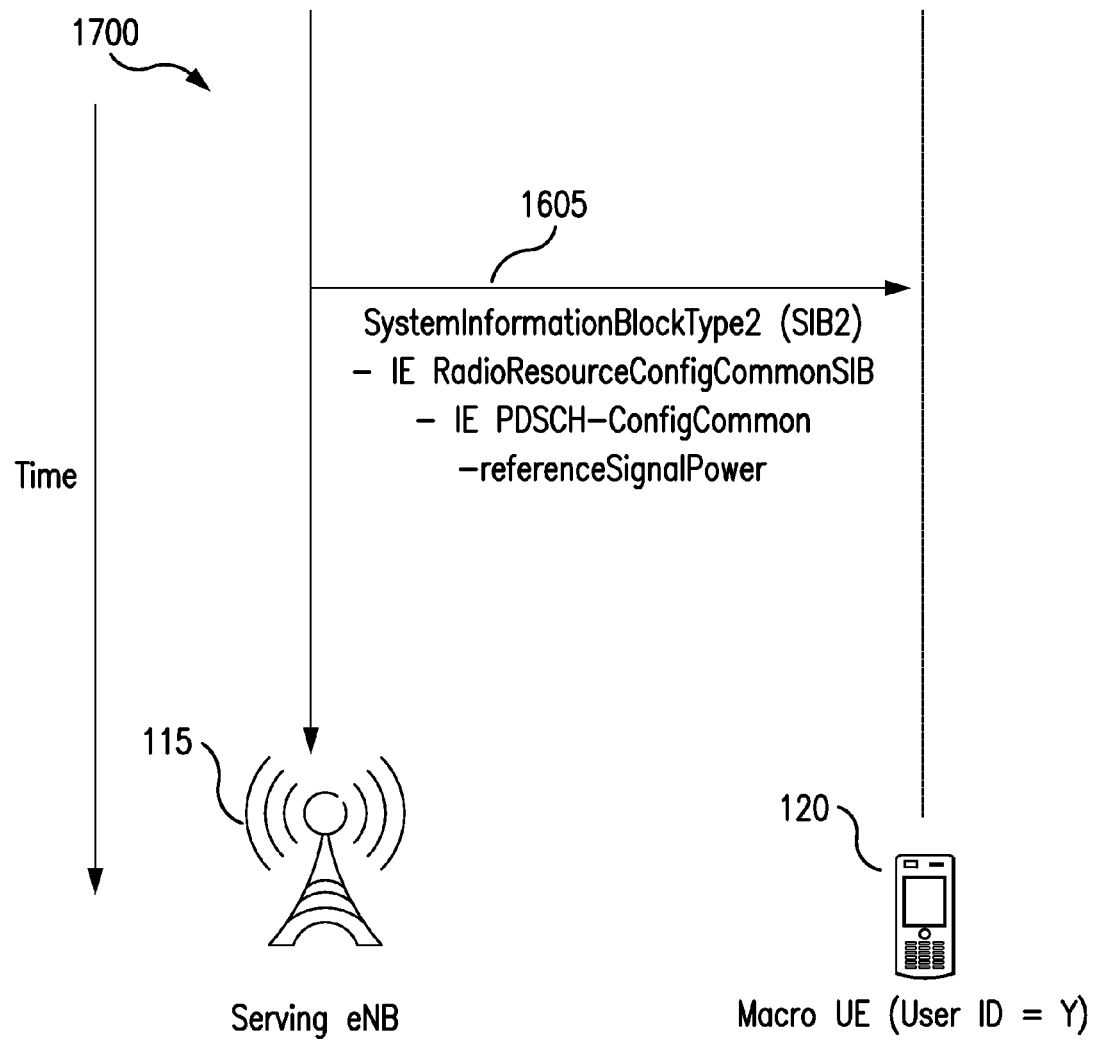
FIG. 17 is a time sequence diagram illustrating an exemplary System Information Block Type 2 (SIB2) messaging flow for a mobile device carrying out a method for adjusting resource management procedures in a mobile device communicating with a node operating in a cell in a heterogeneous communication network, in accordance with exemplary embodiments of the present invention.

Referring to FIG. 17, a time sequence diagram illustrating an exemplary System Information Block Type 2 (SIB2) messaging flow for a mobile device carrying out a method for adjusting resource management procedures in a mobile device communicating with a node operating in a cell in a heterogeneous communication network, in accordance with exemplary embodiments of the present invention, is shown.

In one embodiment, serving eNB 115 sends to mobile device 120 system information, including information relating to cell signal power values, in the form of a System Information Block Type 2 (SIB2) message, which includes IE RadioResourceConfigCommonSIB-IE PDSCH-ConfigCommon, with parameter referenceSignalPower. This information relating to cell signal power values is then utilized by the mobile device 120 to determine whether to adjust radio resource management procedures such as, for example, setting the size of a measurement report, setting the value of measurement gap, determining a Time-to-Trigger value, and determining a signal hysteresis value, in the mobile device 120 by, for example, adjusting one or more of handover, uplink (UL) power control, radio link failure (RLF) recovery and link adaptation.

Figure 18:
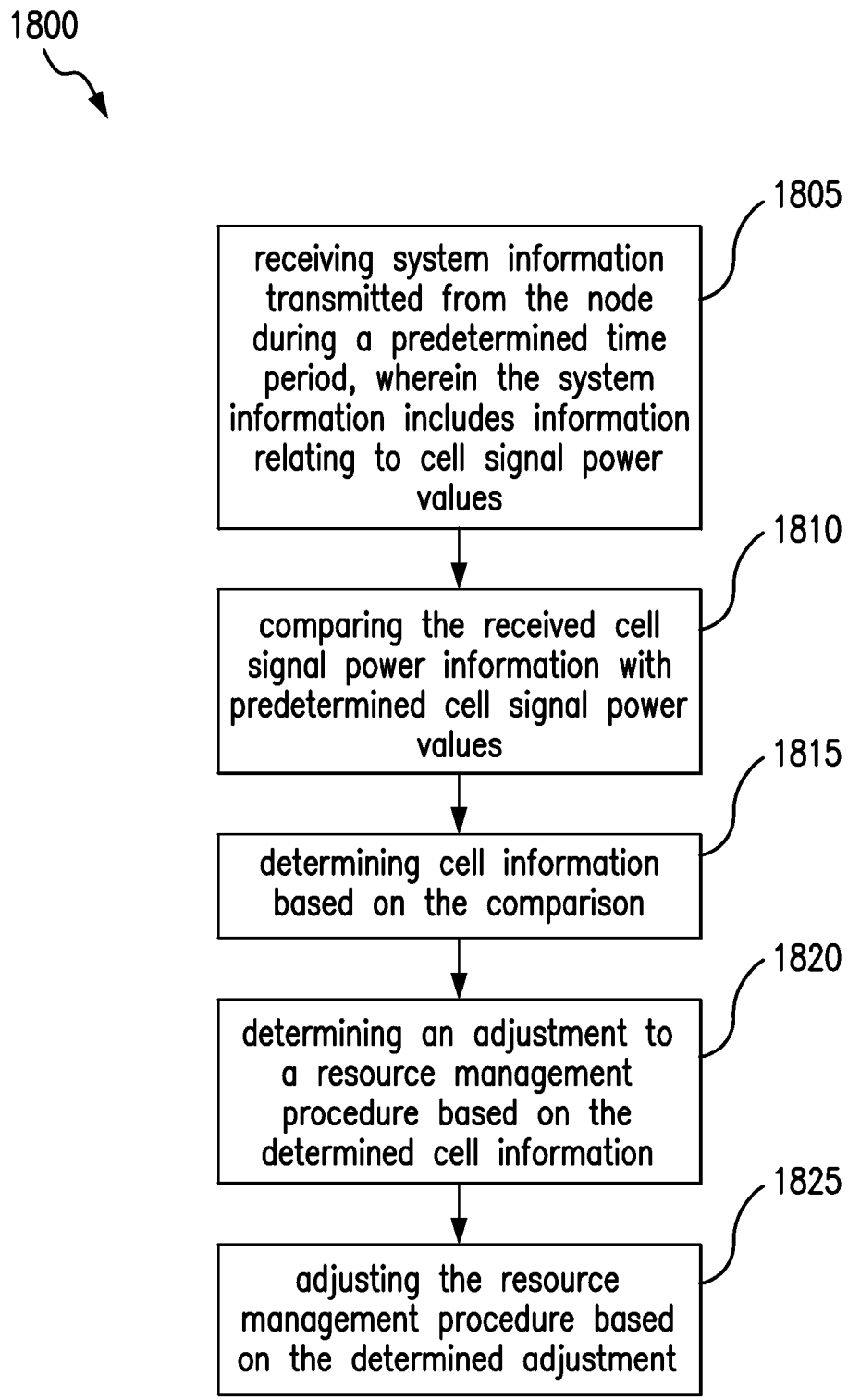
FIG. 18 is a flow chart illustrating the steps performed by a mobile device in a method for adjusting resource management procedures in a mobile device communicating with a node operating in a cell in a heterogeneous communication network using cell signal power, in accordance with exemplary embodiments of the present invention.

Referring now to FIG. 18, a flow chart illustrating the steps performed by a mobile device 120 in a method for adjusting resource management procedures in a mobile device communicating with a node operating in a cell in a heterogeneous communication network using cell signal power, in accordance with exemplary embodiments of the present invention. In the first step 1805, the mobile device 120 receives system information transmitted from the node 110 or 115 during a predetermined time period. The system information includes information relating to cell signal power values. In particular embodiments, the system information includes system information blocks (SIBS) and the cell signal power is a cell reference signal (CRS) power.

In step 1810, the mobile device 120 compares the received cell signal power information with predetermined cell signal power values. In step 1815, the mobile device 120 determines cell information based on the comparison. In step 1820, the mobile device 120 determines an adjustment to a resource management procedure based on the determined cell information and, in step 1825, adjusts the resource management procedure based on the determined adjustment.

Figure 19:
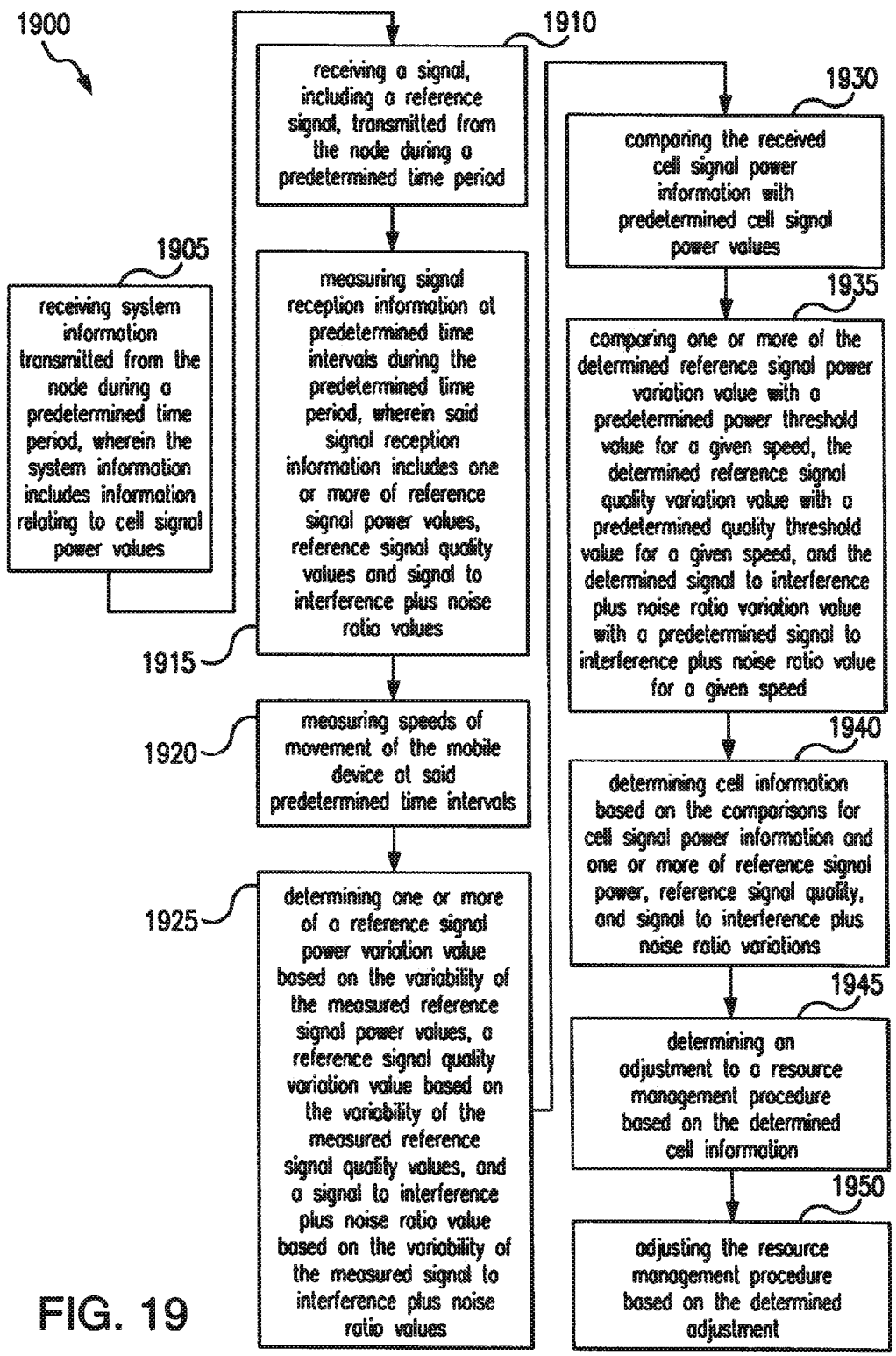
FIG. 19 is a flow chart illustrating the steps performed by a mobile device in a method for adjusting resource management procedures in a mobile device communicating with a node operating in a cell in a heterogeneous communication network using cell signal power and one or more of reference signal power variation, reference signal quality variation and signal to interference plus noise variation, in accordance with exemplary embodiments of the present invention.

FIG. 19 is a flow chart illustrating the steps performed by a mobile device 120 in a method for adjusting resource management procedures in a mobile device communicating with a node operating in a cell in a heterogeneous communication network using cell signal power and one or more of reference signal power variation, reference signal quality variation and signal to interference plus noise variation, in accordance with exemplary embodiments of the present invention. In the first step 1905, the mobile device 120 receives system information transmitted from the node 110 or 115 during a predetermined time period. The system information includes information relating to cell signal power values. In step 1910, the mobile device 120 receives a signal, including a reference signal, transmitted from the node 110 or 115 during a predetermined time period. In step 1815, the mobile device 120 measures signal reception information at predetermined time intervals during the predetermined time period. The signal reception information includes one or more of reference signal power values, reference signal quality values and signal to interference plus noise ratio values. In step 1920, the mobile device 120 measures speeds of movement of the mobile device at the predetermined time intervals. In step 1925, the mobile device determines one or more of a reference signal power variation value based on the variability of the measured reference signal power values, a reference signal quality variation value based on the variability of the measured reference signal quality values and a signal to interference plus noise ratio variation value based on the variability of the measured signal to interference plus noise ratio values.

In step 1930, the mobile device 120 compares the received cell signal power information with predetermined cell signal power values. The mobile device 120, in step 1935, then compares one or more of the determined reference signal power variation value with a predetermined power threshold value for a given measured speed, the determined reference signal quality variation value with a predetermined quality threshold value for a given speed and the determined signal to interference plus noise ratio variation value with a predetermined signal to interference plus noise ratio threshold value for a given speed. In step 1940, the mobile device 120 determines cell information based on the comparisons for cell signal power information and one or more of reference signal power, reference signal quality and signal to interference plus noise ratio variations. In step 1945, the mobile device 120 determines an adjustment to a resource management procedure based on the determined cell information and, in step 1950, adjusts the resource management procedure based on the determined adjustment.

In further exemplary embodiments of the present invention, after the mobile device 120 determines cell information, such as for example cell size and cell type, and prior to determining the adjustment to a resource management procedure, the mobile device 120 transmits a first message to a node 110 or 115. The first message includes a request for cell information. Examples of the different types of cell size and cell type information that may be requested and provided includes cell sizes and types enumerated, for example, in 3GPP2 TS 36.331 and 36.133, and may include very small, small, medium, large, very large, macro, large macro, very large macro, micro, pico and femto cell types and cell sizes. The mobile device 120 receives a second message transmitted from the node 110 or 115, which includes the requested cell information. The mobile device 120 measures signal reception information, processes the received cell information and measured signal reception information, and compares the cell information determined based on the comparison with the processed received cell information and measured signal reception information. If the cell information determined based on the comparison is consistent with the processed received cell information and measured signal reception information (e.g., confirming that the mobile device 120 is communicating with a macrocell base station 110 or that the mobile device 120 is communicating with a micro/pico/femto cell base station 115), then an adjustment to a resource management procedure is determined based on the determined cell information, and the resource management procedure is adjusted based on the determined adjustment. If the cell information determined based on the comparison is not consistent with the processed received cell information and measured signal reception information, no adjustment will be made.

According to particular embodiments of the present invention, the first message and the second message are radio resource control (RRC) messages. In some embodiments, the first message is a radio resource control (RRC) cell information request message and the second message is a radio resource control (RRC) cell information response message. In other embodiments, the first message is a radio resource control (RRC) connection request message and the second message is a radio resource control (RRC) connection response message. In another embodiment, there is no first message transmitted by the mobile device 120, and the node 110 or 115 transmits to the mobile device 120 a second message which is a radio resource control (RRC) measurement control message.

In some embodiments, the cell information includes, in addition to information relating to cell size and cell type, information relating to one or more of system load, node information, maximum transmit power, maximum base station users, number of antennas and antenna gain, and the signal reception information includes information relating to one or more of reference signal received power (RSRP), reference signal received quality (RSRQ), channel quality indicator (CQI), channel state information (CSI), and signal to interference plus noise ratio (SINR). Reference signal received power (RSRP) and reference signal received quality (RSRQ) are described, for example, in 3GPP TS 36.321, and channel quality indicator (CQI) and channel state information (CSI) are described, for example, in 3GPP TS 36.133. More generally, however, the cell information may include or represent any appropriate information relating to the characteristics or configuration of the relevant cell and/or a base station serving the cell. Furthermore, the signal reception information may, more generally, include or represent any appropriate information relating to signal strength, channel quality, or other properties of the signals received by the mobile device or the channel over which the mobile device receives such signals.

As discussed above, in some embodiments, adjusting the radio resource management procedure includes adjusting one or more of handover, uplink (UL) power control, radio link failure (RLF) recovery and link adaptation. Additionally, in embodiments in which the handover procedure is adjusted, the adjustment may include, for example, setting the size of the measurement report, setting the value of measurement gap, determining a Time-to-Trigger value, or determining a signal hysteresis value. In embodiments in which RLF recovery procedures are adjusted, the adjustment may include, for example, determining a particular cell with respect to which the mobile device will perform the RLF recovery. In embodiments in which link adaptation procedures are adjusted, the adjustment may include, for example, adjusting a frequency with which reference signals (such as Sounding Reference Symbols (SRSs)) or channel information (such as Channel Quality Information (CQI)) are communicated between the mobile device and network, or adjusting a modulation and/or coding scheme configuration for the mobile device. In embodiments in which power control is adjusted, the adjustment may include, for example, setting a specific transmission power used by the mobile device or changing the procedure for setting the transmission power (e.g., by changing a size of the incremental power control steps applied by the mobile device when determining an appropriate transmission power).

Figure 20:
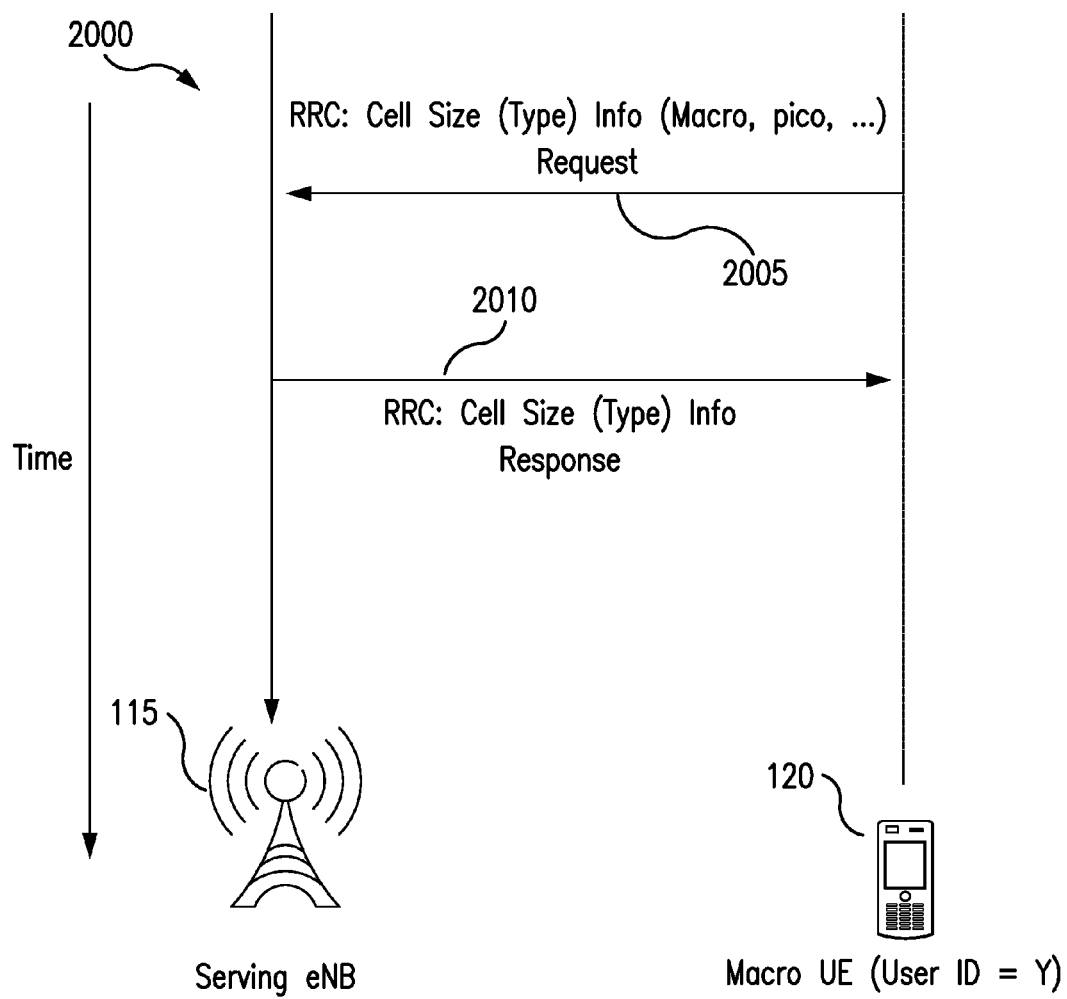
FIG. 20 is a time sequence diagram illustrating a second exemplary using radio resource control (RRC) messaging flow for a method for adjusting resource management procedures in a mobile device communicating with a node operating in a cell in a heterogeneous communication network, in accordance with exemplary embodiments of the present invention.

FIG. 20 is a time sequence diagram illustrating a second exemplary using radio resource control (RRC) messaging flow for a method for adjusting resource management procedures in a mobile device communicating with a node operating in a cell in a heterogeneous communication network, in accordance with exemplary embodiments of the present invention.

Figure 21:
FIG. 21 is a diagram of information elements of a radio resource control (RRC) cell information request message for use in a method for adjusting resource management procedures in a mobile device communicating with a node operating in a cell in a heterogeneous communication network, in accordance with exemplary embodiments of the present invention.

FIG. 21 is a diagram of information elements of a radio resource control (RRC) cell information request message for use in a method for adjusting resource management procedures in a mobile device communicating with a node operating in a cell in a heterogeneous communication network, in accordance with exemplary embodiments of the present invention.

FIG. 22 is a diagram of information elements of a radio resource control (RRC) cell information response message for use in a method for adjusting resource management procedures in a mobile device communicating with a node operating in a cell in a heterogeneous communication network, in accordance with exemplary embodiments of the present invention.

Figure 23:
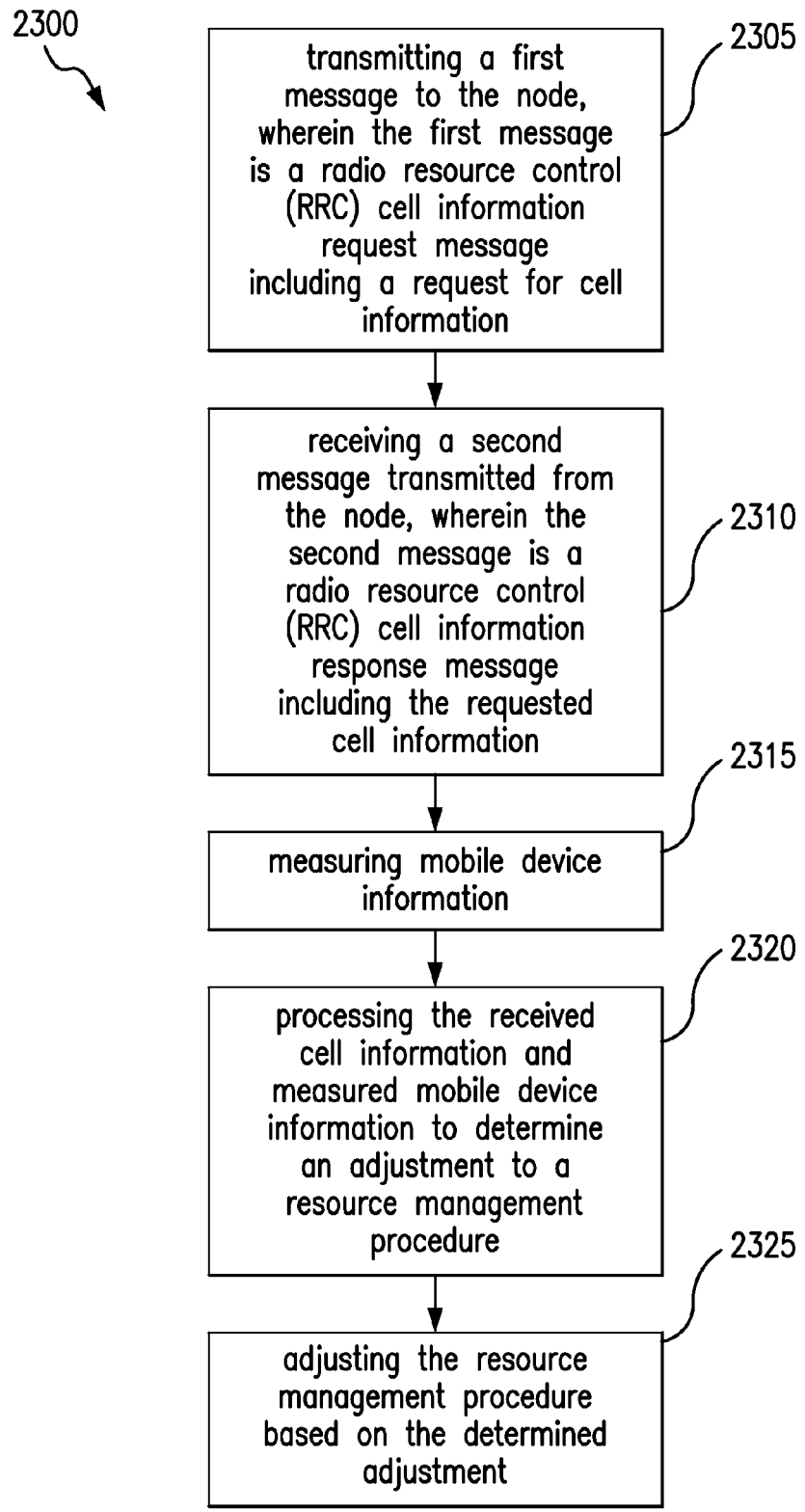
FIG. 23 is a flow chart illustrating the steps performed by a mobile device in a method for adjusting resource management procedures in a mobile device communicating with a node operating in a cell in a heterogeneous communication network using radio resource control (RRC) cell information request and response messages, in accordance with exemplary embodiments of the present invention.

FIG. 23 is a flow chart illustrating the steps performed by a mobile device in a method for adjusting resource management procedures in a mobile device communicating with a node operating in a cell in a heterogeneous communication network using radio resource control (RRC) cell information request and response messages, in accordance with exemplary embodiments of the present invention.

Figure 24:
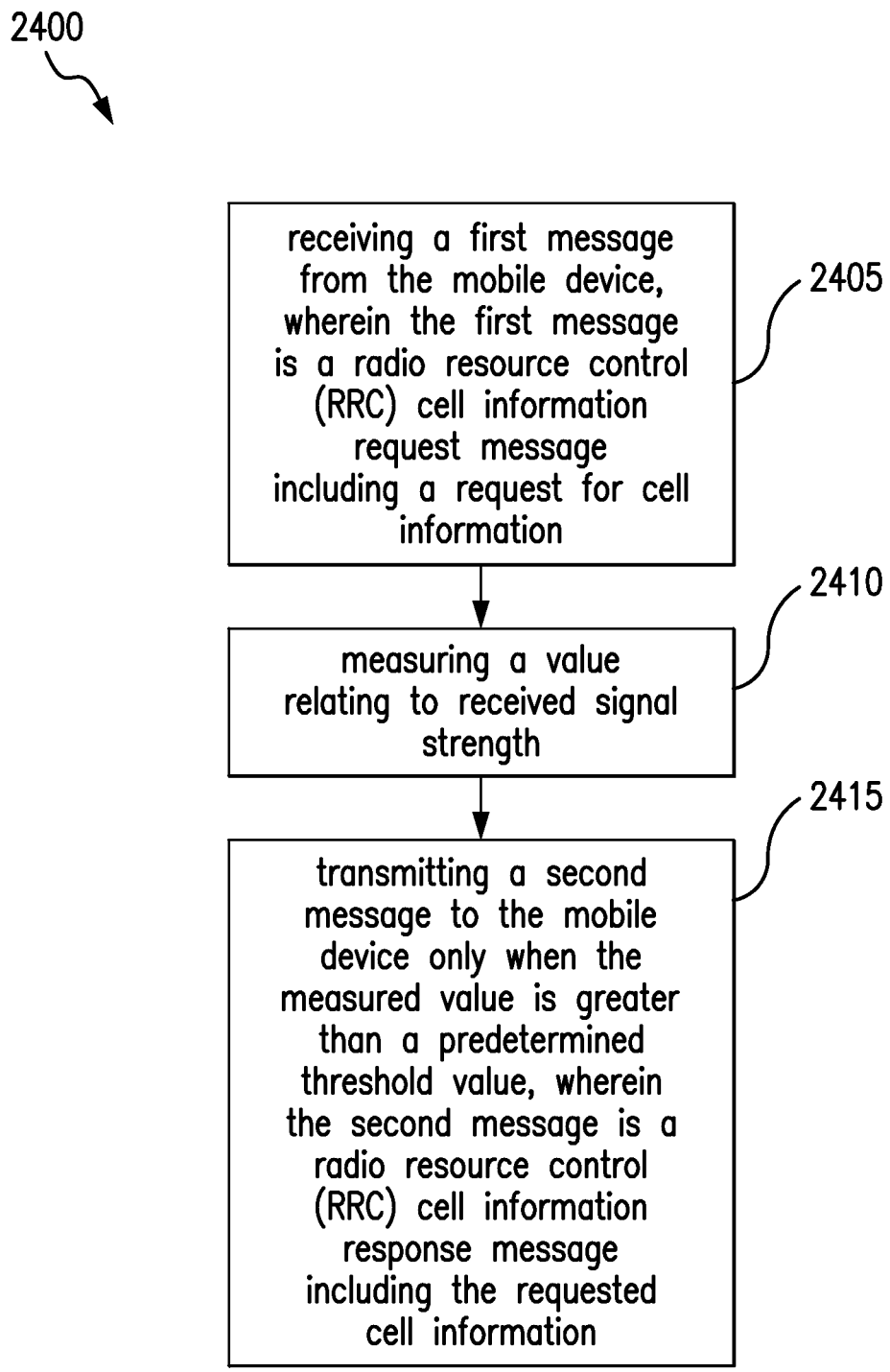
FIG. 24 is a flow chart illustrating the steps performed by a node in a method for adjusting resource management procedures in a mobile device communicating with a node operating in a cell in a heterogeneous communication network using radio resource control (RRC) cell information request and response messages, in accordance with exemplary embodiments of the present invention.

FIG. 24 is a flow chart illustrating the steps performed by a node in a method for adjusting resource management procedures in a mobile device communicating with a node operating in a cell in a heterogeneous communication network using radio resource control (RRC) cell information request and response messages, in accordance with exemplary embodiments of the present invention By determining whether an adjustment to the radio resource management procedure is necessary and making the adjustments to the measurement report size, Time-to-Trigger value and signal hysteresis value, the handover failure rate is reduced.

In another exemplary embodiment, as discussed above, the radio resource management procedure includes setting the size of a measurement report for transmission to the node, and, based on the cell size, the size of the measurement report is adjusted to a standard size or a minimum size.

In yet another exemplary embodiment, as discussed above, the mobile device 120 adjusts an RLF recovery procedure utilized by the mobile device based on the cell information. As one example, the mobile device 120 may use information on cell size, and possibly other suitable considerations (e.g., knowledge of its own speed), in selecting a cell in which to perform RLF recovery. For example, when choosing a cell in which to perform RLF recovery, a slow-moving mobile device may select a smaller cell for RLF recovery over a bigger cell from which the mobile device is receiving a signal of equal or comparable signal strength. Likewise, a fast-moving mobile device may select a bigger cell for RLF recovery over a smaller cell from which the mobile device is receiving a signal of equal or comparable signal strength.

In yet another exemplary embodiment, as discussed above, the mobile device 120 adjusts a link adaptation procedure utilized by the mobile device based on the cell information. As one example, the mobile device may use information on cell size, and possibly other suitable considerations (e.g., knowledge of its own speed), to determine how often reference signals, channel state information, or other information associated with link adaptation should be communicated. For instance, the mobile device 120 may transmit sounding reference symbols or channel status information (such as Channel Quality Indicators (CQI)) less frequently when operating in a small cell (i.e., micro/pico/femto cell) than the relevant mobile device would if operating in a large cell (i.e., macrocell). This may result in lower signaling overhead in the cell and reduce power consumption for the mobile device. As another example, a mobile device may also use cell size to adjust its process for choosing a modulation and coding scheme (MCS). For instance, if a mobile device determines it is operating in small cell, the mobile device may select more aggressive MCS settings based on an assumption that the mobile device is not power limited when operating in a small cell. As a result, the mobile device may be able to achieve greater data throughput by virtue of the more aggressive MCS settings.

In yet another exemplary embodiment, the mobile device 120 adjusts a power control procedure utilized by the mobile device based on the cell information. As one example, the mobile device may use information on cell size to determine a specific transmission power to use. For instance, if a mobile device 120 determines it is operating in a small cell, it may increase its transmission power based on the assumption that the mobile device is not power limited when operating in a small cell. As another example, the mobile device 120 may adjust its procedure for determining an appropriate transmission power level based on the cell information. For instance, the mobile device 120 may, in response to power control commands from the network, increase its transmission power by larger steps sizes than it would in response to receiving the same commands when operating in a large cell (based again on the assumption that the mobile device is not power-limited when operating in a small cell). Because the mobile device 120 can correctly determine it may utilize higher transmission power levels in these scenarios, it may be able to achieve more robust data transmissions and/or greater data throughput.

While various embodiments have been described above, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the methods described above and illustrated in the drawings are shown as a sequence of steps, this was done solely for the sake of illustration. Accordingly, it is contemplated that some steps may be added, some steps may be omitted, the order of steps may be re-arranged, and some steps may be performed in parallel.

What is claimed is:

1. A method for adjusting resource management procedures in a mobile device communicating with a node operating in a cell in a heterogeneous communication network, the method comprising:
  receiving a signal, including a reference signal, transmitted from the node during a predetermined time period;
  measuring signal reception information at predetermined time intervals during the predetermined time period, wherein said signal reception information includes reference signal power values and one or more of reference signal quality values and signal to interference plus noise ratio values;
  measuring speeds of movement of the mobile device at said predetermined time intervals;
  determining a reference signal power variation value based on the variability of the measured reference signal power values;
  comparing the determined reference signal power variation value with a predetermined power threshold value for a given measured speed;
  determining cell information based on the comparison;
  determining an adjustment to a resource management procedure based on the determined cell information;
  adjusting the resource management procedure based on the determined adjustment;
  determining one or more of a reference signal quality variation value based on the variability of the measured reference signal quality values and a signal to interference plus noise ratio variation value based on the variability of the measured signal to interference plus noise ratio values; and
  comparing one or more of the determined reference signal quality variation value with a predetermined quality threshold value for a given speed and the determined signal to interference plus noise ratio variation value with a predetermined signal to interference plus noise ratio threshold value for a given speed;
  wherein determining the cell information is based on the comparisons for reference signal power and one or more of reference signal quality and signal to interference plus noise ratio variations.

2. The method of claim 1, wherein the cell information includes information relating to one or more of cell size and cell type.

3. The method of claim 1, wherein the resource management procedure is a radio resource management procedure and wherein adjusting the radio resource management procedure includes adjusting one or more of handover, uplink (UL) power control, radio link failure (RLF) recovery and link adaptation.

4. The method of claim 3, wherein adjusting handover includes one or more of setting the size of a measurement report, setting a value of a measurement gap, determining a Time-to-Trigger value, and determining a signal hysteresis value.

5. The method of claim 4, wherein the radio resource management procedure includes setting the size of a measurement report for transmission to the node, and based on whether the reference signal power variation value is greater than or less than the predetermined power threshold value, the size of the measurement report is adjusted to a minimum size or a standard size.

6. The method of claim 1, wherein the reference signal power values are reference signal received power (RSRP) values and the reference signal quality values are reference signal received quality (RSRQ) values.

7. The method of claim 1, wherein the signal reception information further includes Doppler frequency shift values, and wherein the method further comprises:
  comparing the received Doppler frequency shift values with a predetermined Doppler signature,
  wherein determining the cell information is based on the comparisons for reference signal power variation and Doppler frequency shift.

8. The method of claim 7, wherein the resource management procedure is a radio resource management procedure and wherein adjusting the radio resource management procedure includes adjusting one or more of handover, uplink (UL) power control, radio link failure (RLF) recovery and link adaptation.

9. The method of claim 8, wherein adjusting handover includes one or more of setting the size of a measurement report, setting a value of a measurement gap, determining a Time-to-Trigger value, and determining a signal hysteresis value.

10. The method of claim 1, wherein the signal reception information further includes information relating to the vertical angle of arrival of the received signal, and wherein the method further comprises:
  determining an estimated location of an antenna located at the node based on the vertical angle of arrival of the received signal; and
  comparing the determined estimated location with a predetermined elevation value,
  wherein determining the cell information is based on the comparisons for antenna location and for reference signal power variation.

11. The method of claim 10, further comprising measuring position information at said predetermined time intervals to obtain 3D coordinate values for the mobile device and estimating the vertical angle of arrival of the received signal.

12. A mobile device operable in a heterogeneous communication network to transmit messages to and receive messages from a node operating in a cell, comprising:
  a processor;
  a memory coupled to the processor;
  a transceiver coupled to the processor; and an antenna coupled to the transceiver configured to transmit and receive messages;

wherein the processor is configured to:
receive a signal, including a reference signal, transmitted from the node during a predetermined time period;
measure signal reception information at predetermined time intervals during the predetermined time period, wherein said signal reception information includes reference signal power values and one or more of reference signal quality values and signal to interference plus noise ratio values;
measure speeds of movement of the mobile device at said predetermined time intervals;
determine a reference signal power variation value based on the variability of the measured reference signal power values;
compare the determined reference signal power variation value with a predetermined power threshold value for a given measured speed;
determine cell information based on the comparison;
determine an adjustment to a resource management procedure based on the determined cell information;
adjust the resource management procedure based on the determined adjustment;
determine one or more of a reference signal quality variation value based on the variability of the measured reference signal quality values and a signal to interference plus noise ratio variation value based on the variability of the measured signal to interference plus noise ratio values; and
compare one or more of the determined reference signal quality variation value with a predetermined quality threshold value for a given speed and the determined signal to interference plus noise ratio variation value with a predetermined signal to interference plus noise ratio threshold value for a given speed;
wherein determining the cell information is based on the comparisons for reference signal power and one or more of reference signal quality and signal to interference plus noise ratio variations.

13. The mobile device of claim 12, wherein the cell information includes information relating to one or more of cell size and cell type.

14. The mobile device of claim 12, wherein the resource management procedure is a radio resource management procedure and wherein adjusting the radio resource management procedure includes adjusting one or more of handover, uplink (UL) power control, radio link failure (RLF) recovery and link adaptation.

15. The mobile device of claim 14, wherein adjusting handover includes one or more of setting the size of a measurement report, setting a value of a measurement gap, determining a Time-to-Trigger value, and determining a signal hysteresis value.

16. The mobile device of claim 15, wherein the radio resource management procedure includes setting the size of a measurement report for transmission to the node, and based on whether the reference signal power variation value is greater than or less than the predetermined power threshold value, the size of the measurement report is adjusted to a minimum size or a standard size.

17. The mobile device of claim 12, wherein the reference signal power values are reference signal received power (RSRP) values and the reference signal quality values are reference signal received quality (RSRQ) values.

18. The mobile device of claim 12, wherein the signal reception information further includes Doppler frequency shift values, and wherein the processor is further configured to:
compare the received Doppler frequency shift values with a predetermined Doppler signature,
wherein determining the cell information is based on the comparisons for reference signal power variation and Doppler frequency shift.

19. The mobile device of claim 18, wherein the resource management procedure is a radio resource management procedure and wherein adjusting the radio resource management procedure includes adjusting one or more of handover, uplink (UL) power control, radio link failure (RLF) recovery and link adaptation.

20. The mobile device of claim 19, wherein adjusting handover includes one or more of setting the size of a measurement report, setting a value of a measurement gap, determining a Time-to-Trigger value, and determining a signal hysteresis value.

21. The mobile device of claim 19, wherein the signal reception information further includes information relating to the vertical angle of arrival of the received signal, and wherein the processor is further configured to:
determine an estimated location of an antenna located at the node based on the vertical angle of arrival of the received signal; and
compare the determined estimated location with a predetermined elevation value,
wherein the determination of the cell information is based on the comparisons for antenna location and for reference signal power variation.

22. The mobile device of claim 21, wherein the processor is further configured to:
measure position information at said predetermined time intervals to obtain 3D coordinate values for the mobile device; and
estimate the vertical angle of arrival of the received signal.

23. A method for adjusting resource management procedures in a mobile device communicating with a node operating in a cell in a heterogeneous communication network, the method comprising:
receiving messages transmitted from the node during a predetermined time period, wherein the messages are radio resource control (RRC) measurement configuration messages including information relating to handover triggers;
comparing the received handover trigger information with predetermined handover trigger values;
determining cell information based on the comparison;
determining an adjustment to a resource management procedure based on the determined cell information;
adjusting the resource management procedure based on the determined adjustment;
receiving a signal, including a reference signal, transmitted from the node during the predetermined time period;
measuring signal reception information at predetermined time intervals during the predetermined time period, wherein said signal reception information includes one or more of reference signal power values, reference signal quality values and signal to interference plus noise ratio values;
measuring speeds of movement of the mobile device at said predetermined time intervals;
determining one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values; and comparing one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed;

wherein determining cell information is based on the comparisons for handover triggers and one or more of reference signal power, reference signal quality, and signal to interference plus noise ratio variations.

24. The method of claim 23, wherein the cell information includes information relating to one or more of cell size and cell type.

25. The method of claim 23, wherein the resource management procedure is a radio resource management procedure and wherein adjusting the radio resource management procedure includes adjusting one or more of handover, uplink (UL) power control, radio link failure (RLF) recovery and link adaptation.

26. The method of claim 25, wherein adjusting handover includes one or more of setting the size of a measurement report, setting a value of a measurement gap, determining a Time-to-Trigger value, and determining a signal hysteresis value.

27. The method of claim 23, wherein the handover trigger information and predetermined handover trigger values include information relating to one or more of handover margin and time to trigger values.

28. The method of claim 23, wherein the handover trigger information and predetermined handover trigger values include information relating to one or more of handover margin and time to trigger values.

29. The method of claim 23, wherein the reference signal power values are reference signal received power (RSRP) values and the reference signal quality values are reference signal received quality (RSRQ) values.

30. A mobile device operable in a heterogeneous communication network to transmit messages to and receive messages from a node operating in a cell, comprising:
a processor;
a memory coupled to the processor;
a transceiver coupled to the processor; and
an antenna coupled to the transceiver configured to transmit and receive messages;
wherein the processor is configured to:
receive messages transmitted from the node during a predetermined time period, wherein the messages are radio resource control (RRC) measurement configuration messages including information relating to handover triggers;
compare the received handover trigger information with predetermined handover trigger values;
determine cell information based on the comparison;
determine an adjustment to a resource management procedure based on the determined cell information;
adjust the resource management procedure based on the determined adjustment;
receive a signal, including a reference signal, transmitted from the node during the predetermined time period;
measure signal reception information at predetermined time intervals during the predetermined time period, wherein said signal reception information includes one or more of reference signal power values, reference signal quality values and signal to interference plus noise ratio values;
measure speeds of movement of the mobile device at said predetermined time intervals;
determine one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values; and
compare one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed;
wherein determining cell information is based on the comparisons for handover triggers and one or more of reference signal power, reference signal quality, and signal to interference plus noise ratio variations.

31. The mobile device of claim 30, wherein the cell information includes information relating to one or more of cell size and cell type.

32. The mobile device of claim 30, wherein the resource management procedure is a radio resource management procedure and wherein adjusting the radio resource management procedure includes adjusting one or more of handover, uplink (UL) power control, radio link failure (RLF) recovery and link adaptation.

33. The mobile device of claim 32, wherein adjusting handover includes one or more of setting the size of a measurement report, setting a value of a measurement gap, determining a Time-to-Trigger value, and determining a signal hysteresis value.

34. The mobile device of claim 30, wherein the handover trigger information and predetermined handover trigger values include information relating to one or more of handover margin and time to trigger values.

35. The mobile device of claim 30, wherein the handover trigger information and predetermined handover trigger values include information relating to one or more of handover margin and time to trigger values.

36. The mobile device of claim 30, wherein the reference signal power values are reference signal received power (RSRP) values and the reference signal quality values are reference signal received quality (RSRQ) values.

37. A method for adjusting resource management procedures in a mobile device communicating with a node operating in a cell in a heterogeneous communication network, the method comprising:
receiving system information transmitted from the node during a predetermined time period, wherein the system information includes information relating to cell signal power values;
comparing the received cell signal power information with predetermined cell signal power values;
determining cell information based on the comparison;
determining an adjustment to a resource management procedure based on the determined cell information;

adjusting the resource management procedure based on the determined adjustment;

receiving a signal, including a reference signal, transmitted from the node during the predetermined time period;

measuring signal reception information at predetermined time intervals during the predetermined time period, wherein said signal reception information includes one or more of reference signal power values, reference signal quality values and signal to interference plus noise ratio values;

measuring speeds of movement of the mobile device at said predetermined time intervals;

determining one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values; and comparing one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed;

wherein determining cell information is based on the comparisons for cell signal power information and one or more of reference signal power, reference signal quality, and signal to interference plus noise ratio variations.

38. The method of claim 37, wherein the cell information includes information relating to one or more of cell size and cell type.

39. The method of claim 37, wherein the resource management procedure is a radio resource management procedure and wherein adjusting the radio resource management procedure includes adjusting one or more of handover, uplink (UL) power control, radio link failure (RLF) recovery and link adaptation.

40. The method of claim 39, wherein adjusting handover includes one or more of setting the size of a measurement report, setting a value of a measurement gap, determining a Time-to-Trigger value, and determining a signal hysteresis value.

41. The method of claim 37, wherein the system information includes system information blocks (SIBs) and the cell signal power is a cell reference signal (CRS) power.

42. The method of claim 37, wherein the system information includes system information blocks (SIBs) and the cell signal power is a cell reference signal (CRS) power.

43. The method of claim 37, wherein the reference signal power values are reference signal received power (RSRP) values and the reference signal quality values are reference signal received quality (RSRQ) values.

44. A mobile device operable in a heterogeneous communication network to transmit messages to and receive messages from a node operating in a cell, comprising:

a processor;

a memory coupled to the processor;

a transceiver coupled to the processor; and an antenna coupled to the transceiver configured to transmit and receive messages;

wherein the processor is configured to:

receive system information transmitted from the node during a predetermined time period, wherein the system information includes information relating to cell signal power values;

compare the received cell signal power information with predetermined cell signal power values;

determine cell information based on the comparison;

determine an adjustment to a resource management procedure based on the determined cell information; and adjust the resource management procedure based on the determined adjustment;

receive a signal, including a reference signal, transmitted from the node during the predetermined time period;

measure signal reception information at predetermined time intervals during the predetermined time period, wherein said signal reception information includes one or more of reference signal power values, reference signal quality values and signal to interference plus noise ratio values;

measure speeds of movement of the mobile device at said predetermined time intervals;

determine one or more of a reference signal power variation value based on the variability of the measured reference signal power values, a reference signal quality variation value based on the variability of the measured reference signal quality values, and a signal to interference plus noise ratio value based on the variability of the measured signal to interference plus noise ratio values; and compare one or more of the determined reference signal power variation value with a predetermined power threshold value for a given speed, the determined reference signal quality variation value with a predetermined quality threshold value for a given speed, and the determined signal to interference plus noise ratio variation value with a predetermined signal to interference plus noise ratio value for a given speed;

wherein determining cell information is based on the comparisons for cell signal power information and one or more of reference signal power, reference signal quality, and signal to interference plus noise ratio variations.

45. The mobile device of claim 44, wherein the cell information includes information relating to one or more of cell size and cell type.

46. The mobile device of claim 44, wherein the resource management procedure is a radio resource management procedure and wherein adjusting the radio resource management procedure includes adjusting one or more of handover, uplink (UL) power control, radio link failure (RLF) recovery and link adaptation.

47. The mobile device of claim 46, wherein adjusting handover includes one or more of setting the size of a measurement report, setting a value of a measurement gap, determining a Time-to-Trigger value, and determining a signal hysteresis value.

48. The mobile device of claim 44, wherein the system information includes system information blocks (SIBs) and the cell signal power is a cell reference signal (CRS) power.

49. The mobile device of claim 44, wherein the system information includes system information blocks (SIBs) and the cell signal power is a cell reference signal (CRS) power.

50. The mobile device of claim 44, wherein the reference signal power values are reference signal received power (RSRP) values and the reference signal quality values are reference signal received quality (RSRQ) values.

* * * * *

UNITED STATES PATENT AND TRADEMARK OFFICE
CERTIFICATE OF CORRECTION

PATENT NO. : 8,750,876 B2
APPLICATION NO. : 13/454857
DATED : June 10, 2014
INVENTOR(S) : Dimou et al.

Page 1 of 1

It is certified that error appears in the above-identified patent and that said Letters Patent is hereby corrected as shown below:

Specification

In Column 2, Line 56, delete "over 51." and insert -- over S1. --, therefor.

In Column 6, Line 42, delete "(SIBS)" and insert -- (SIBs) --, therefor.

In Column 19, Line 20, delete "(SIBS)" and insert -- (SIBs) --, therefor.

Claims

In Column 26, Line 21, in Claim 21, delete "claim 19," and insert -- claim 12, --, therefor.

Signed and Sealed this
Ninth Day of February, 2016

Michelle K. Lee
*Director of the United States Patent and Trademark Office*